(12) United States Patent
Fu et al.

(10) Patent No.: US 11,558,826 B2
(45) Date of Patent: Jan. 17, 2023

(54) POWER HEADROOM REPORT METHOD AND APPARATUS

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 16/326,530

(22) PCT Filed: Aug. 18, 2017

(86) PCT No.: PCT/KR2017/009029
§ 371 (c)(1),
(2) Date: Feb. 19, 2019

(87) PCT Pub. No.: WO2018/034541
PCT Pub. Date: Feb. 22, 2018

(65) Prior Publication Data
US 2021/0289451 A1 Sep. 16, 2021

(30) Foreign Application Priority Data

Aug. 19, 2016 (CN) .......................... 201610697340.3
Mar. 23, 2017 (CN) .......................... 201710178670.6
(Continued)

(51) Int. Cl.
*H04W 52/36* (2009.01)
*H04W 52/24* (2009.01)
(Continued)

(52) U.S. Cl.
CPC ....... *H04W 52/365* (2013.01); *H04W 52/242* (2013.01); *H04W 52/367* (2013.01);
(Continued)

(58) Field of Classification Search
None
See application file for complete search history.

(56) References Cited

U.S. PATENT DOCUMENTS 9,094,926 B2 7/2015 Kim et al.
10,728,860 B2 * 7/2020 Lee ........................ H04W 52/40
(Continued)

FOREIGN PATENT DOCUMENTS

CN 105264850 A 1/2016
CN 105407524 A 3/2016
(Continued)

OTHER PUBLICATIONS

European Search Report dated Sep. 25, 2019, issued in European Patent Application No. 17841723.4.
(Continued)

Primary Examiner — Jenkey Van
(74) Attorney, Agent, or Firm — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present application discloses a power headroom report (PHR) method and apparatus. A user equipment (UE) determines a PHR reporting manner according to the structure of an uplink subframe in an active serving cell, calculates PHR according to the reporting manner, and sends the PHR to a base station. According to the present disclosure, a UE
(Continued)

proactively determines the PHR reporting manner, calculates PHR and report the PHR, thus implements PHR reporting process at the UE.

22 Claims, 15 Drawing Sheets

(30) Foreign Application Priority Data

Jun. 15, 2017 (CN) .......................... 201710451999.5
Jul. 27, 2017 (CN) .......................... 201710623798.9

(51) Int. Cl.
 H04W 72/04 (2009.01)
 H04W 72/12 (2009.01)
(52) U.S. Cl.
 CPC ... H04W 72/0446 (2013.01); H04W 72/1268 (2013.01); H04W 72/1289 (2013.01)

(56) References Cited

U.S. PATENT DOCUMENTS

| | | | |
|---|---|---|---|
| 2010/0158147 A1 | 6/2010 | Zhang et al. | |
| 2012/0040707 A1 | 2/2012 | Kim et al. | |
| 2014/0219234 A1 | 8/2014 | Kim et al. | |
| 2015/0098424 A1 | 4/2015 | Li | |
| 2015/0350944 A1 | 12/2015 | Chen et al. | |
| 2016/0198421 A1* | 7/2016 | Yi | H04W 52/367 370/329 |
| 2016/0255594 A1* | 9/2016 | Vajapeyam | H04W 52/365 455/522 |
| 2018/0167896 A1* | 6/2018 | Uchino | H04W 72/14 |
| 2018/0249428 A1* | 8/2018 | Huang | H04W 52/365 |
| 2019/0098622 A1* | 3/2019 | Lee | H04W 72/0446 |
| 2019/0116611 A1* | 4/2019 | Lee | H04W 72/1284 |
| 2019/0174432 A1* | 6/2019 | Wang | H04W 52/365 |
| 2021/0021454 A1* | 1/2021 | Horiuchi | H04W 52/346 |

FOREIGN PATENT DOCUMENTS

| | | |
|---|---|---|
| EP | 2683193 A1 | 1/2014 |
| JP | 2017520988 A | 7/2017 |
| JP | 2016133126 A1 | 11/2017 |
| KR | 10-2012-0048491 A | 5/2012 |
| KR | 20160018287 A * | 2/2016 |
| KR | 10-2016-0052578 A | 5/2016 |
| KR | 10-2017-0007824 A | 1/2017 |
| WO | 2012/060660 A2 | 5/2012 |
| WO | 2013/165228 A1 | 11/2013 |
| WO | WO 2015188316 A1 * | 6/2014 |
| WO | 2015/005325 A1 | 1/2015 |
| WO | 2015/187267 A1 | 12/2015 |

OTHER PUBLICATIONS

European Office Action dated Jun. 17, 2020, issued in a counterpart European Application No. 17 841 723.4-1205.
European Office Action dated Oct. 29, 2020, issued in a counterpart European Application No. 17 841 723.4-1205.
Japanese Office Action dated Jul. 20, 2021, cited in a Japanese Application No. 2019-510291.
Chinese Office Action dated Jul. 2, 2021, cited in a Chinese Application No. 2017106237989.
ITRI; PHR format for CA; Discussion and decision; 3GPP TSG RAN WG2 #71bis R2-105818; Oct. 15, 2010, Xi'an, China.
Korean Notice of Patent Grant dated Dec. 21, 2021, issued in a counterpart Korean Application No. 10-2019-7007957.
Chinese Office Action dated Dec. 23, 2021, issued in a counterpart Chinese Application No. 201710623798.9.
Indian Office Action dated Nov. 18, 2021, issued in a counterpart Chinese Application No. 201947010284.
Extended European Search Report dated Feb. 2, 2022, issued in a counterpart European Application No. 21203507.5-1205/3962185.
European Office Action dated Jul. 17, 2022, issued in a counterpart European Application No. 21 203 507.5.
Indian Office Action dated Jul. 20, 2022, issued in a counterpart Indian Application No. 202248008213.

* cited by examiner

POWER HEADROOM REPORT METHOD AND APPARATUS

TECHNICAL FIELD

The present application relates to mobile communications, and particularly, to a power headroom report (PHR) method and apparatus.

BACKGROUND ART

To meet the demand for wireless data traffic having increased since deployment of $4^{th}$ generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Long Term Evolution (LTE) systems support two duplexing modes, i.e. Frequency Division Duplexing (FDD) and Time Division Duplexing (TDD). Transmission in an LTE system includes downlink transmission which is from a base station (e.g., eNB) to a user equipment (UE) and uplink transmission which is from a UE to a base station. In a TDD system, uplink transmission and downlink transmission are performed on the same carrier at different time. In an FDD system, uplink transmission and downlink transmission are performed on different carriers. FIG. 1 is a schematic diagram illustrating a frame structure in an LTE TDD system. Each radio frame is 10 ms, and is subdivided uniformly into two half-frames of 5 ms. Each half-frame includes 8 time slots of 0.5 ms and 3 special fields of 1 ms, i.e. downlink pilot time slot (DwPTS), guard period (GP) and uplink pilot time slot (UpPTS). Each subframe is composed of two consecutive time slots. According to the frame structure as shown in FIG. 1, in every 10 ms, there are 10 subframes shared by uplink transmission and downlink transmission. Each subframe may be assigned for uplink transmission or downlink transmission. A subframe assigned for uplink transmission is referred to as an uplink subframe, and a subframe assigned for downlink transmission is referred to as a downlink subframe. TDD systems support 7 types of uplink/downlink (UL/DL) configurations as shown in Table 1, where D stands for downlink subframe, U stands for uplink subframe, S stands for special subframes in the 3 special fields.

TABLE 1

| | | LTE TDD UL/DL configuration | | | | | | | | | |
|---|---|---|---|---|---|---|---|---|---|---|---|
| Configuration serial number | Switch-point periodicity | Subframe index | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Downlink data is transmitted through Physical Downlink Shared Channels (PDSCH). Hybrid Automatic Retransmission Request-acknowledgement (HARQ-ACK) may be transmitted through Physical Uplink Shared Channels (PUSCH) or Physical Uplink Control Channels (PUCCH). Uplink data is transmitted through Physical Uplink Shared Channels (PUSCH).

In an LTE system, multiple component carriers (CC) are aggregated to obtain larger working bandwidth, i.e., carrier aggregation (CA). Each CC is also referred to as a serving cell. The aggregated carriers constitute downlink and uplink links in the communication system, therefore larger transmission rates can be achieved. When a UE is configured to be in a CA mode, one of cells is a primary cell (Pcell), and other cells are referred to as secondary cells (Scell). According to LTE, PUSCH may be transmitted in any uplink CC, and PUCCH may be transmitted in the Pcell or in a specified uplink Scell.

Under current LTE provisions, the transmitting power of a PUCCH in subframe i of a serving cell c is determined according to the below formula:

$$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array} \right\} [dBm]$$

Definitions of parameters in the above formula can be found in 3rd Generation Partnership Project (3GPP) 36.213 v10.9.0 Section 5.1.2.1. The following is a brief introduction to the parameters.

$P_{CMAX,c}(i)$ is the maximum transmitting power configured for the UE in a serving cell c;

$\Delta_{F\_PUCCH}(F)$ is a power offset from a reference format (which is PUCCH format $1a$ in LTE);

$\Delta_{TxD}(F')$ is a parameter related with the PUCCH format and whether transmitter diversity is used;

$PL_c$ is path loss;

$P_{O\_PUCCH}$ is power offset configured by higher layer signaling;

$g(i)$ is an accumulative sum of closed-loop power control;

$h(n_{CQI}, n_{HARQ}, n_{SR})$ is power offset in connection with PUCCH format, is also related with the number of bits of uplink control information (UCI) to be fed back, $n_{CQI}$ is the number of bits of channel state information (CSI) to be fed back in subframe i, $n_{SR}$ is the number of bits of scheduling request (SR) to be fed back in subframe i, the value of $n_{SR}$ is 0 or 1, and $n_{HARQ}$ is the number of bits of HARQ-ACK that are actually to be fed back in subframe i.

For example, for PUCCH format 3, when CSI is to be fed back, $$h(n_{CQI}, n_{HARQ}, n_{SR}) = \frac{n_{HARQ} + n_{SR} + n_{CQI} - 1}{3}.$$

According to current LTE provisions, the transmitting power of a PUSCH in subframe i of a serving cell c is determined according to the below formula:

$$P_{PUSCH,c}(i) = \min \left\{ \begin{array}{c} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [\text{dBm}]$$

Definitions of parameters in the above formula can be found in 3rd Generation Partnership Project (3GPP) 36.213 v10.9.0 Section 5.1.1.1. The following is a brief introduction to the parameters.

$P_{CMAX,c}(i)$ is the maximum transmitting power configured for the UE in subframe i in a serving cell c;

$M_{PUSCH,c}(i)$ is the number of physical resource blocks (PRB) occupied by the PUSCH;

$P_{O\_PUSCH,c}(j)$ is a power offset configured by higher layer signaling;

$PL_c$ is path loss;

$\alpha_c(j)$ is for controlling the path loss compensating rate; j=0 for PUSCH or PUSCH re-transmission in Semi-persistent scheduling (SPS); j=1 for PUSCH or PUSCH re-transmission in dynamic scheduling; j=2 for PUSCH or PUSCH re-transmission in random access response (RAR) scheduling.

$f_c(i)$ is an accumulative value of closed-loop power control;

$\Delta_{TF,c}(i)$ is a parameter related with modulation and coding scheme (MCS) of uplink transmission. Specifically, when $K_S$ equals 1.25, $\Delta_{TF,c}(i)=10 \log_{10} ((2^{BPRE \cdot K_s}-1) \cdot \beta_{offset}^{PUSCH})$. When only Aperiodic CSI (A-CSI) is transmitted and no uplink data is transmitted, $BPRE=O_{CQI}/N_{RE}$, and $\beta_{offset}^{PUSCH} = \beta_{offset}^{CQI}$. When uplink data is transmitted, $$BPRE = \sum_{r=0}^{C-1} K_r / N_{RE}, \text{ and}$$

$$\beta_{offset}^{PUSCH} = 1.$$

C is the number of code blocks in a transmission block (TB), $K_r$ is the number of bits of the r'th CB, $N_{RE}$ is the total number of resource elements (RE) in a PUSCH.

In order to provide reference to a base station for scheduling uplink resources, a UE may report in a power headroom report (PHR) the power headroom that is left under specific scheduling scheme. The UE may determine whether to report only the PHR of type 1 or report both the PHR of type 1 and the PHR of type 2 according to configurations of the UE as to whether the UE is allowed to transmit a PUSCH and a PUCCH within the same subframe. That is, if the UE is configured to transmit a PUSCH and a PUCCH within the same subframe, the UE may determine to simultaneously report the PHR of type 1 and the PHR of type 2 to a serving cell that receives reported PUCCH; if the UE is configured not to transmit a PUSCH and a PUCCH within the same subframe, the UE may determine to report only the PHR of type 1 to the serving cell that receives reported PUCCH. The following are the methods of calculating the PHR of type 1 and the PHR of type 2.

(1) Calculation method of type-1 PHR

If the UE transmits a PUSCH without transmitting a PUCCH in a subframe i of serving cell d, the may be calculated according to the following formula:

$$PH_{type1,c}(i)=P_{CMAX,c}(i)-\{10 \log_{10}(M_{PUSCH,c}(i))+ P_{O\_PUSCH,c}(j)+\alpha_c(j)\cdot PL_c+\Delta_{TF,c}(i)+f_c(i)\} \quad [\text{dB}]$$

Definitions of parameters in the above formula can be found in 3rd Generation Partnership Project (3GPP) 36.213 v10.9.0 Section 5.1.1.1.

If the UE transmits a PUSCH and a PUCCH both in a subframe i of serving cell c, the type-1 PHR may be calculated according to the following formula:

$$PH_{type1,c}(i)=\tilde{P}_{CMAX,c}(i)\{10 \log_{10}(M_{PUSCH,c}(i))+ P_{O\_PUSCH,c}(j)+\alpha_c(j)\cdot PL_c+\Delta_{TF,c}(i)+f_c(i)\} \quad [\text{dB}]$$

In the formula, definitions of $M_{PUSCH,c}(i)$, $P_{O\_PUSCH,c}(j)$, $\alpha_c(j)$, $PL_c$, $\Delta_{TF,c}(i)$ and $f_c(i)$ can be found in 3rd Generation Partnership Project (3GPP) 36.213 v10.9.0 Section 5.1.1.1. $\tilde{P}_{CMAX,c}(i)$ is the maximum transmitting power of PUSCH calculated when it is assumed that the UE only transmits PUSCH in the subframe i of the serving cell c.

If the UE does not transmit a PUSCH in a subframe i of serving cell c, the type-1 PHR may be calculated according to the following formula:

$$PH_{type1,c}(i)=\tilde{P}_{CMAX,c}(i)-\{P_{O\_PUSCH,c}(1)+\alpha_c(1)\cdot PL_c+f_c(i)\} \quad [\text{dB}]$$

Definitions of parameters in the above formula can be found in 3rd Generation Partnership Project (3GPP) 36.213 v10.9.0 Section 5.1.1.1.

(2) Calculation Method of Type-2 PHR

If the UE transmits both a PUSCH and a PUCCH in a subframe i of serving cell c, the type-2 PHR may be calculated according to the following formula:

$$PH_{type2}(i) = P_{CMAX,c}(i) - 10\log_{10}\left( \begin{array}{l} 10^{\left(\frac{10\log_{10}(M_{PUSCH,c}(i))+P_{O\_PUSCH,c}(j)+}{\alpha_c(j)\cdot PL_c+\Delta_{TF,c}(i)+f_c(i)}\right)/10} + \\ 10^{\left(\frac{P_{O\_PUCCH}+PL_c+h(n_{CQI},n_{HARQ},n_{SR})+}{\Delta_{F\_PUCCH}(F)+\Delta_{TxD}(F')+g(i)}\right)/10} \end{array} \right) [\text{dB}]$$

In the formula, definitions of $M_{PUSCH,c}(i)$, $P_{O\_PUSCH,c}(j)$, $\alpha\alpha_c(j)$, $PL_c$, $\Delta_{TF,c}(i)$ and $f_c(i)$ can be found in 3GPP 36.213 v10.9.0 Section 5.1.1.1, definitions of $P_{O\_PUCCH}$, $PL_C$, $h(n_{CQI},n_{HARQ},n_{SR})$, $\Delta_{F\_PUCCH}(F)$, $\Delta T_{TxD}(F')$ and $g(i)$ can be found in 3GPP 36.213 v10.9.0 Section 5.1.2.1.

If the UE transmits a PUSCH without transmitting a PUCCH in a subframe i of serving cell c, the type-2 PHR may be calculated according to the following formula:

$$PH_{type2}(i) = P_{CMAX,c}(i) - 10\log_{10}\left( 10^{\left(\frac{10\log_{10}(M_{PUSCH,c}(i))+P_{O\_PUSCH,c}(j)+}{\alpha_c(j)\cdot PL_c+\Delta_{TF,c}(i)+f_c(i)}\right)/10} + 10^{(P_{O\_PUCCH}+PL_c+g(i))/10} \right) [\text{dB}]$$

In the formula, definitions of $M_{PUSCH,c}(i)$, $P_{O\_PUSCH,c}(j)$, $\alpha_c(j)$, $PL_c$, $\Delta_{TF,c}(i)$ and $f_c(i)$ can be found in 3GPP 36.213 v10.9.0 Section 5.1.1.1, definitions of $P_{O\_PUCCH}$, $PL_c$, and g(i) can be found in 3GPP 36.213 v10.9.0 Section 5.1.2.1.

If the UE transmits a PUSCH without transmitting a PUCCH in a subframe i of serving cell c, the type-2 PHR may be calculated according to the following formula:

$$PH_{type2}(i) = P_{CMAX,c}(i) - 10\log_{10}\left(\begin{array}{c}10^{(P_{O\_PUSCH,c}(1)+\alpha_c(1)\cdot PL_c+f_c(i))/10} + \\ 10^{\left(P_{0\_PUCCH}+PL_c+h(n_{CQI},n_{HARQ},n_{SR})+\Delta_{F\_PUCCH}(F)+\Delta_{TxD}(F')+g(i)\right)/10}\end{array}\right)[dB]$$

In the formula, definitions of $P_{O\_PUSCH,c}(1)$, $\alpha_c(1)$, $PL_c$ and $f_c(i)$ can be found in 3GPP 36.213 v10.9.0 Section 5.1.1.1, and definitions of $P_{O\_PUCCH}$, $PL_c$, $h(n_{CQI}, n_{HARQ}, n_{SR})$, $\Delta_{F\_PUCCH}(F)$, and g(i) can be found in 3GPP 36.213 v10.9.0 Section 5.1.2.1.

If the UE does not transmit a PUSCH nor a PUCCH in a subframe i of serving cell c, the type-2 PHR may be calculated according to the following formula:

$$PH_{type2}(i) = \tilde{P}_{CMAX,c}(i) - 10\log_{10}\left(10^{(P_{O\_PUSCH,c}(1)+\alpha_c(1)\cdot PL_c+f_c(i))/10} + 10^{(P_{0\_PUCCH}+PL_c+g(i))/10}\right)[dB]$$

In the formula, definitions of $P_{O\_PUSCH,c}(1)$, $\Delta_c(1)$, $PL_c$ and $f_c(i)$ can be found in 3GPP 36.213 v10.9.0 Section 5.1.1.1, and definitions of $P_{O\_PUCCH}$, $PL_C$, and g(i) can be found in 3GPP 36.213 v10.9.0 Section 5.1.2.1.

The eNB may determine the time of transmitting the PHR by configuring two timers and downlink path loss change (dl-PathlossChange) via higher layer signaling. The two timers include a periodic PHR timer (PeriodicPHR-Timer) and a prohibit PHR timer (ProhibitPHR-Timer). The following codes are the two timers and the dl-PathlossChange configured via higher layer signaling. Configuration of the PeriodicPHR-Timer and the ProhibitPHR-Timer is in unit of subframe of 1 ms.

```
phr-Config CHOICE {
  release NULL,
  setup SEQUENCE {
  periodicPHR-Timer ENUMERATED {sf10, sf20, sf50, sf100, sf200,
    sf500, sf1000, infinity
  prohibitPHR-Timer ENUMERATED {sf0, sf10, sf20, sf50, sf100,
    sf200, sf500, sf1000},
  dl-PathlossChange ENUMERATED {dB1, dB3, dB6, infinity}
  }
    }
```

Any one of the following events may trigger the PHR:

1. the ProhibitPHR-Timer ends or has ended and the change in path loss of any serving cell exceeds a pre-determined range of path loss change;
2. the PeriodicPHR-Timer ends;
3. functions of PHR is configured or re-configured;
4. a serving cell configured with uplink transmission is activated.

After PHR is triggered and before PHR transmission is performed, PHR is to be transmitted when the UE has PUSCH resources for initial transmission data and allocated PUSCH resources can bear PHR MAC control element and subheader.

If extended PHR is configured, a CA system is always configured with extended PHR, and the UE has to report the PHR of all of active serving cells. A PHR is generated for each active serving cell, and PHRs of all of active serving cells are transmitted on PUSCH resources of one serving cell.

If extended PHR is not configured, i.e., in a non-CA system, UE has to report the PHR of a serving cell.

After transmitting PHR in a subframe, the UE may start or re-start the PeriodicPHR-Timer and the ProhibitPHR-Timer, and cancel all PHR trigger.

The above is a simple introduction to the PHR types when reporting PHR and how to determine the time of transmitting PHR. But there is no specification about how to determine the type of the reported PHR and the time of reporting the PHR when a UE needs to report PHR. That is, it is a problem yet to be solved as to how a UE reports PHR.

DISCLOSURE OF INVENTION

Technical Problem

In view of the foregoing, the present application provides a PHR method to enable a UE to report PHR.

The present application also provides a PHR apparatus to implement the method of a UE reports PHR.

Solution to Problem

According to the above objectives, the present application provides the following technical schemes.

A PHR method may include:

determining, by a UE, a PHR reporting manner according to a structure of an uplink subframe in an active serving cell; and calculating, by the UE, PHR according to the PHR reporting manner, and transmitting the PHR to a base station.

A PHR apparatus, comprising: a determining unit, a calculating unit and a transmitting unit, the determining unit is for determining a PHR reporting manner according to a structure of an uplink subframe in an active serving cell;

the calculating module is for calculating the PHR according to the PHR reporting manner; and the transmitting unit is for transmitting the calculated PHR to a base station.

According to the above technical scheme, the method and apparatus of embodiments of the present disclosure enables a UE to proactively determine the PHR reporting manner, calculate PHR and report the PHR, thus implements PHR reporting process at the UE.

Advantageous Effects of Invention

Various embodiments of the present disclosure provide an improved system performance.

BEST MODE FOR CARRYING OUT THE INVENTION

In order to make the objectives, technical schemes and merits of the present application clearer, a detailed description of the present application is hereinafter given with reference to specific embodiments.

Figure 1:
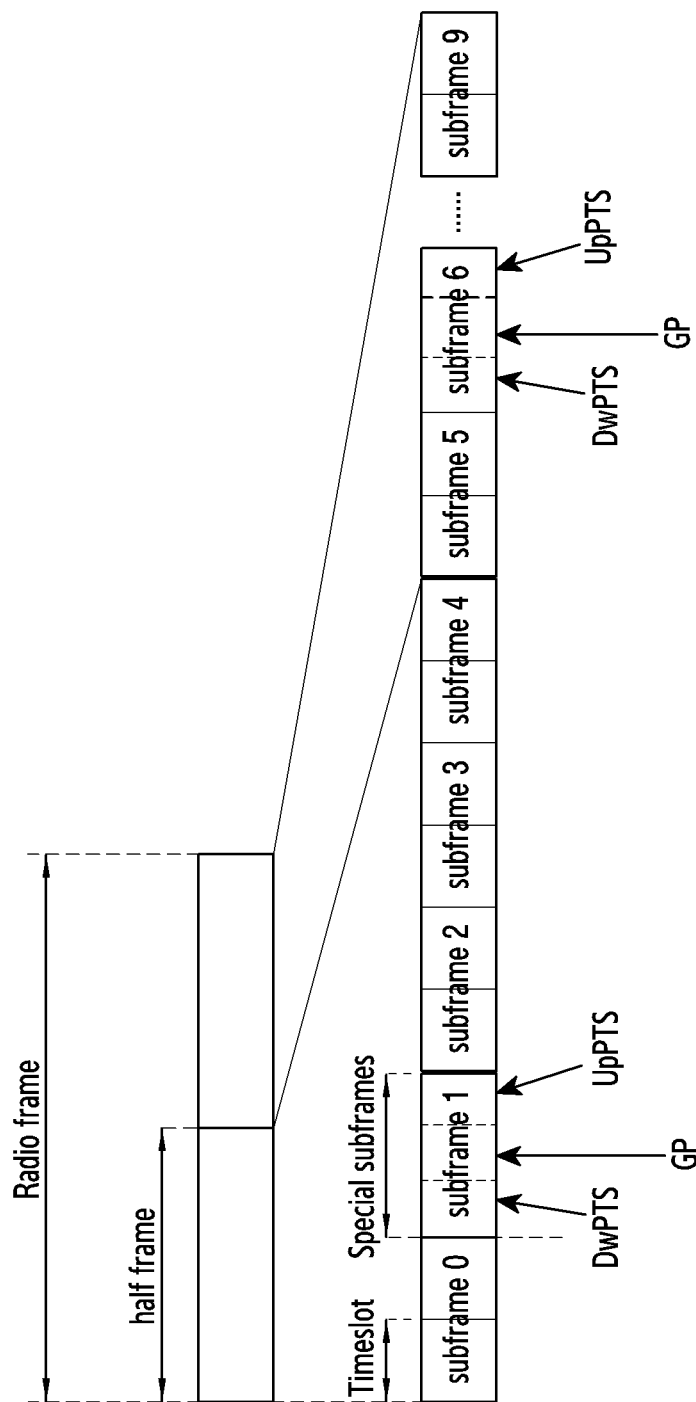
FIG. 1 is a schematic diagram illustrating a conventional frame structure in an LTE TDD system.
Figure 2:
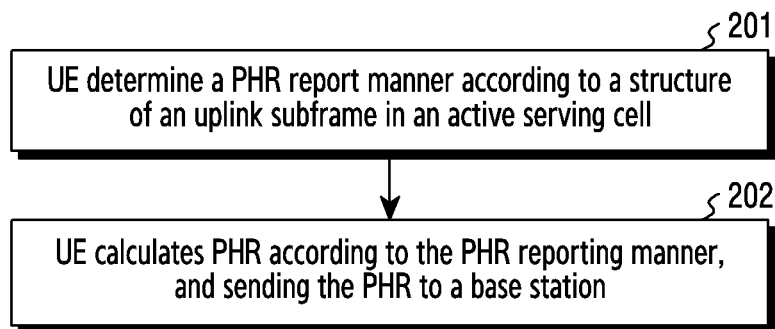
FIG. 2 is a flowchart illustrating a PHR method in accordance with embodiments of the present disclosure.

In view of the objective of the present disclosure, various embodiments provide a PHR method. As shown in FIG. 2, the method may include the following procedures.

In step 201, a UE determines a PHR reporting manner according to a structure of an uplink subframe in an active serving cell.

In step 202, the UE calculates PHR according to the PHR reporting manner, and transmits the PHR to a base station.

The mechanism of the present disclosure is hereinafter described in detail with reference to the several examples.

Embodiment One

This embodiment introduces a configuration method and a usage method of a PeriodicPHR-Timer and a ProhibitPHR-Timer of PHR. There are the following situations.

Figure 3:
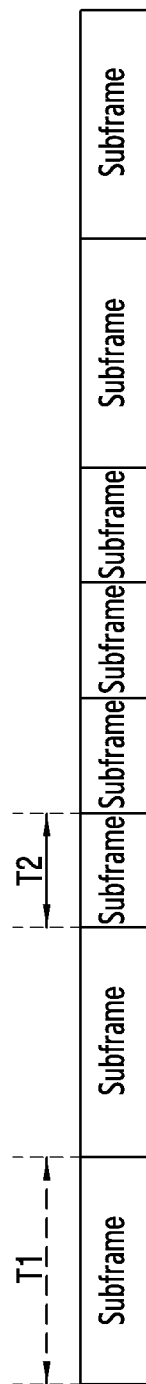
FIG. 3 is a schematic diagram illustrating subframe lengths in different time periods of a serving cell of a UE in accordance with embodiment one of the present disclosure.

Situation one: A UE is configured with one serving cell, i.e., one carrier. Subframes have different lengths in different time periods, and the subframe length is configured by higher layer signaling or pre-defined in a protocol or indicated by physical layer signaling. For example, FIG. 3 is a schematic diagram illustrating subframe length in different time periods in a serving cell of a UE in accordance with embodiment one of the present disclosure. As shown in FIG. 3, subframes in some time periods have a length of T1 ms, (e.g., T1 may be 1 ms); subframes in some time periods have a length of T2 ms, (e.g., T2 may be 0.5 ms).

Figure 4:
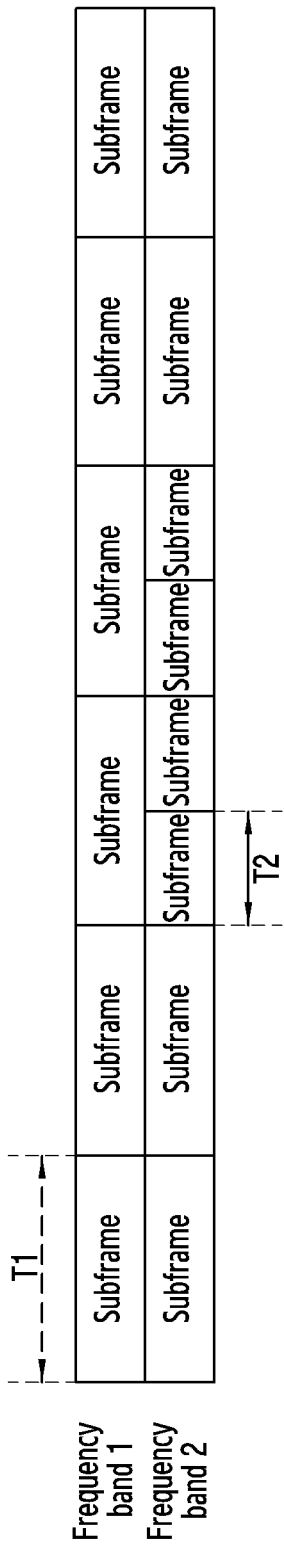
FIG. 4 is a schematic diagram illustrating subframe lengths in different frequency bands within the same time period of a serving cell of a UE in accordance with embodiment one of the present disclosure.

Situation two: A UE is configured with one serving cell, i.e., one carrier. Subframes may have different lengths in different frequency bands within the same time period, and the subframe length may be configured by higher layer signaling or pre-defined in a protocol or indicated by physical layer signaling. For example, FIG. 4 is a schematic diagram illustrating subframe length in different frequency bands within the same time period in a serving cell of a UE in accordance with embodiment one of the present disclosure. As shown in FIG. 4, subframes in some frequency bands have a length of T1 ms, (e.g., T1 may be 1 ms); subframes in some frequency bands have a length of T2 ms, (e.g., T2 may be 0.5 ms).

Figure 5:
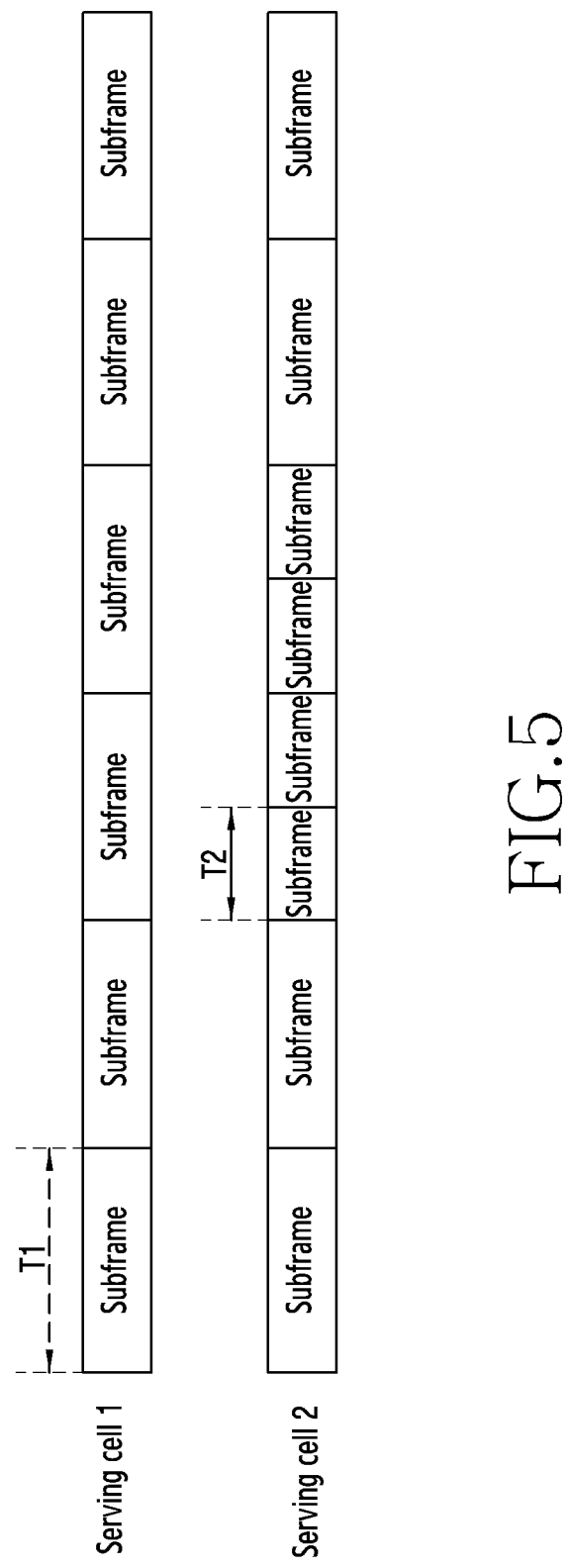
FIG. 5 is a schematic diagram illustrating subframe lengths in the same time period of different serving cells of a UE in accordance with embodiment one of the present disclosure.

Situation three: A UE is configured with a plurality of serving cells, i.e., the UE is configured with a plurality of carriers. Subframes may have different lengths in different serving cells within the same time period, and the subframe length may be configured by higher layer signaling or pre-defined in a protocol or indicated by physical layer signaling. For example, FIG. 5 is a schematic diagram illustrating subframe length in a plurality of serving cells of a UE within the same time period in accordance with embodiment one of the present disclosure. As shown in FIG. 5, subframes in some serving cells have a length of T1 ms, (e.g., T1 may be 1 ms); subframes in some serving cells have a length of T2 ms, (e.g., T2 may be 0.5 ms).

In situation one, situation two and situation three, the UE may use the following method to determine configurations of the PeriodicPHR-Timer and the ProhibitPHR-Timer in PHR, and determine the time of reporting the PHR according to the PeriodicPHR-Timer and the ProhibitPHR-Timer in PHR.

Configurations of the PeriodicPHR-Timer and the ProhibitPHR-Timer are in unit of time T. T is configured by higher layer signaling or pre-defined in a protocol, and is referred to as reference time unit. For example, T may be configured by higher layer signaling or defined by a protocol as 1 ms, after the value of T is determined, the PeriodicPHR-Timer and the ProhibitPHR-Timer may be determined according to configurations as shown below.

```
phr-Config CHOICE {
  release NULL,
  setup SEQUENCE {
  periodicPHR-Timer ENUMERATED {10T, 20T, 50T, 100T, 200T,5001, 1000T,
  infinity},
    prohibitPHR-Timer ENUMERATED {0T, 10T, 20T, 50T, 100T,
        200T, 500T,
  1000T },
    }
```

After receiving the above configurations, the UE may identify the PeriodicPHR-Timer and the ProhibitPHR-Timer, and determine the time of reporting the PHR according to the two timers.

That is, when the subframe length equals T, T is taken as the unit for numbering all of subframes. For example, when T is counted by milli-seconds, e.g., the value of T may be 0.5 ms, all of subframes are numbered and the serial number of a subframe is t, t is a natural number. The state values of the PeriodicPHR-Timer and the ProhibitPHR-Timer are calculated according to the serial number t of the subframes.

Figure 6:
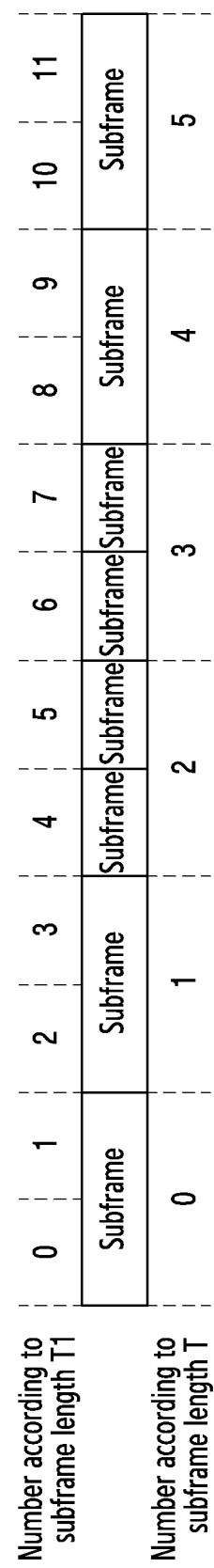
FIG. 6 is a schematic diagram illustrating a first example of PeriodicPHR-Timer and ProhibitPHR-Timer determined by a UE in PHR in accordance with embodiment one of the present disclosure.

When the subframe length T1 is smaller than T, all of subframes are numbered in unit of T1, and the subframes are numbered as t1=0, 1, . . . . The value of the PeriodicPHR-Timer and the ProhibitPHR-Timer are calculated according to floor(t1/(T/T1)), and floor( ) represents a rounding down operation. That is, the state values of the PeriodicPHR-Timer and the ProhibitPHR-Timer are calculated according to the serial number of a subframe whose subframe length is T which includes a subframe whose subframe length is T1, as shown in FIG. 6. FIG. 6 is a schematic diagram illustrating example one of PeriodicPHR-Timer and ProhibitPHR-Timer in PHR determined by a UE in accordance with embodiment one of the present disclosure.

Figure 7:
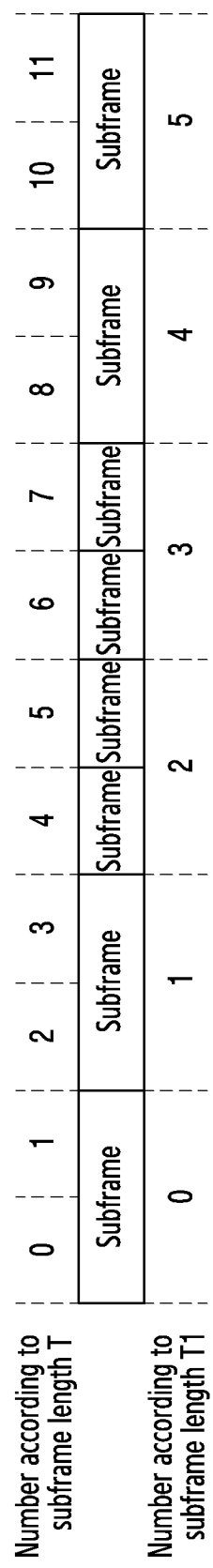
FIG. 7 is a schematic diagram illustrating a second example of PeriodicPHR-Timer and ProhibitPHR-Timer determined by a UE in PHR in accordance with embodiment one of the present disclosure.

When the subframe length T1 is larger than T, all of subframes are numbered in unit of T1, and the subframes are numbered as t1=0, 1, . . . . The state values of the PeriodicPHR-Timer and the ProhibitPHR-Timer are calculated according to t1*(T1/T). That is, the state values of the PeriodicPHR-Timer and the ProhibitPHR-Timer are calculated according to the serial number of the first subframe in subframes whose subframe length is T which are covered by a subframe whose subframe length is T1, as shown in FIG. 7. FIG. 7 is a schematic diagram illustrating example two of PeriodicPHR-Timer and ProhibitPHR-Timer in PHR determined by a UE in accordance with embodiment one of the present disclosure.

When a UE is configured with more than one serving cells, another method of determining PeriodicPHR-Timer and ProhibitPHR-Timer includes activating PHR in each of different serving cells or different serving cell sets configured for the UE using an individual PeriodicPHR-Timer and/or ProhibitPHR-Timer. Activating PHR using an individual PeriodicPHR-Timer and/or ProhibitPHR-Timer refers to each of different serving cells or different serving cell sets configured for the UE uses the time unit and value of an individual PeriodicPHR-Timer and/or ProhibitPHR-Timer, and PHR of each of different serving cells or PHRs of each of different serving cell sets configured for the UE are activated by respective PeriodicPHR-Timer and/or ProhibitPHR-Timer and reported separately. The UE determines the time unit and the value of the PeriodicPHR-Timer and/or ProhibitPHR-Timer corresponding to each serving cell configured for the UE from received higher layer signaling.

The following is an example. In the example, a UE is configured with 3 serving cells, i.e., serving cell 1, serving cell 2 and serving cell 3, and is configured with 2 pairs of PeriodicPHR-Timer and ProhibitPHR-Timer for PHR report, one is PeriodicPHR-Timer-1 and ProhibitPHR-Timer-1, the other is PeriodicPHR-Timer-2 and ProhibitPHR-Timer-2. Serving cell 1 and serving cell 2 form a serving cell set whose PHR is activated by PeriodicPHR-Timer-1 and ProhibitPHR-Timer-1 before the PHR of serving cell 1 and PHR of serving cell 2 are reported together. PHR of serving cell 3 is activated by PeriodicPHR-Timer-2 and ProhibitPHR-Timer-2 and then reported.

The method can use a simple processing manner given that different serving cells have different timeslot lengths. In addition, different serving cells may have very different path losses. Some serving cells may have small changes in path loss, e.g., serving cells operating at low frequency bands may have small changes in path loss. Some other serving cells may have great changes in path loss, e.g., serving cells operating at high frequency bands may have great changes in path loss. According to the method where PHR report for all of serving cells is activated when the changes in path loss of serving cells at high frequency bands reach a threshold, the PHR report may consume too much physical uplink resources. By contrast, the method of activating PHR using individual PeriodicPHR-Timer and ProhibitPHR-Timer can report only the PHR of serving cells operating at high frequency bands, thus can avoid the consumption of too much physical resources by PHR report.

Embodiment Two

This embodiment introduces a method of transmitting PHR.

When the UE is configured with at least two serving cells, and at least two of the serving cells are activated, subframes of at least one active serving cell have different subframe lengths in different time periods, as shown in FIG. 3. In another example, when the UE is configured with at least two serving cells, and at least two of the serving cells are activated, subframes of at least one active serving cell have different subframe lengths in different frequency bands within the same time period, as shown in FIG. 4.

The UE may determine the subframe length according to the following methods.

1) The UE may determine the subframe length according to received higher layer signaling.

2) The UE may determine the subframe length according to received public physical layer signaling.

3) The UE may determine the subframe length according to received UE-specific physical layer signaling, e.g., the length of a subframe which transmits a PUSCH may be identified using uplink (UL) downlink control information (DCI) which schedules the PUSCH.

Since subframes having different lengths may have different requirements on code error rate of transmitting PUSCH service, parameters for power control may be different. For example, the length of a subframe for transmitting regular service may be 1 ms, and the code error rate requirement may be 1%; and the length of a subframe for transmitting high-reliable low-delay service may be 0.25, and the code error rate requirement may be 10e-5. In order to provide reference to the base station for scheduling UL resources, the UE needs to report PHR. In an example, two types of services may have different power control parameters, and two types of PHR may be reported, referred to as first type PHR and second type PHR. That is because each PUSCH transmission may have corresponding type of PHR reported when different PUSCH transmissions adopt different power control parameters. For example, type-1 services are regular services, type-2 services are services requiring low delay and high reliability. In another example, there are different waveforms for PUSCH transmission, e.g., a type of waveform for PUSCH transmission is cyclic prefix-OFDM (CP-OFDM), another type of waveform for PUSCH transmission is single carrier-OFDM (SC-OFDM), and the two types of waveforms also need to report respective PHRs. In yet another example, there are different sub-carrier spaces for PUSCH transmission, e.g., a type of sub-carrier space for PUSCH transmission is 15 kHz, another type of sub-carrier space for PUSCH transmission is 60 kHz, and the two types of sub-carrier spaces also need to report respective PHRs. In still another example, beams for PUSCH transmission may be in different directions, and respective PHRs of the beams may be reported. In view of the factors analyzed above, a UE may identify the number of individual PHRs to be reported and characteristics of the PHRs using received configurations from higher layer signaling or physical signaling. Characteristics of each PHR include factors of PUSCH transmission for calculating the PHR, including waveform, sub-carrier space, service, beam, etc. The method may be extended to be applied to situations where more than two PHRs are reported, and the reported PHRs have at least one characteristic, e.g., waveform, sub-carrier space, service, beam, different from each other.

For a plurality of serving cells configured for a UE, some serving cells may have the same subframe length in different time periods and different frequency bands, and only one type of service is transmitted. Thus, a set of power control parameters are defined. For example, only one type of PHR is reported to a serving cell which only transmits regular services or only transmits high reliability low-delay services. There may be some serving cells which have different subframe lengths in different time periods and in different frequency bands and may transmit two types of services, thus have two sets of power control parameters. For such serving cells, two types of PHR may be reported. The UE may determine whether to report one type of PHR or two types of PHR for each serving cell configured for the UE.

Method One

Regarding a serving cell for which two types of PHR are reported, the two types of PHR are reported in a time division multiplexing manner, and for each serving cell, only one of the first type PHR and the second type PHR is reported each time. The UE may determine whether to report the first type PHR or the second type PHR according to the following manners.

Manner a:

According to configurations received from higher layer signaling, a UE may identify which subframes are used by the UE for reporting the first type PHR and which subframes are used for reporting the second type PHR, thus the UE and the base station may not mistake the type of reported PHR.

When the UE needs to report PHR in the subframe, the UE may report a type of PHR corresponding to the subframe as configured by higher layer signaling. This method requires the subframes in which the UE transmits different services in the serving cell are also configured by higher layer signaling. Subframes configured for transmitting one type of service cannot be changed dynamically to be subframes for transmitting another type of service, and this may affect timely transmission of high-reliability low-delay services.

Manner b:

The UE may determine whether to report the first type PHR or the second type PHR in a subframe according to content transmitted in the subframe in a specific serving cell. Specifically, when the subframe transmits PUSCH of category-1 service only, the UE may report the first-type PHR; when the subframe transmits PUSCH of category-2 service only, the UE may report the second type PHR. When the UE transmits both a PUSCH of category-1 service and a PUSCH of category-2 service, or the UE does not transmit a PUSCH of category-1 service nor a PUSCH of category-2 service, the higher layer signaling configures which subframes are used for reporting the first type PHR by the UE and which subframes are used for reporting the second type PHR. In another example, PHR may be reported according to a default type of PHR determined according to a protocol, e.g., the second type PHR is reported in such situation. This method may result in mistaking the type of PHR. For example, when a base station schedules category-1 service which means the UE should report the first type PHR, but the UE does not receive scheduling signaling from the serving cell, the UE may report the second type PHR according to rules, thus the UE and the base station may mistake the type of the PHR reported. The UE may distinguish the category-1 service and the category-2 service by different DCI formats or by a bit indicator in DCI or by an RNTI for scrambling the DCI.

Manner c:

The UE may determine whether to report the first type PHR or the second type PHR in a subframe according to scheduling information of the subframe in a specific serving cell. Specifically, when only PUSCH of category-1 service is transmitted in the subframe, the UE may report the first type PHR. When only PUSCH of category-2 service transmitted in the subframe, the UE may report the second type PHR. When the UE transmits both a PUSCH of category-1 service and a PUSCH of category-2 service in the subframe or when the UE does not transmit a PUSCH of category-1 service nor a PUSCH of category-2 service in the subframe, the type of PHR to be reported by the UE may be determined according to higher layer signaling which configures which subframes are for reporting the first type PHR and which subframes are for reporting the second type PHR. In another example, the type of PHR to be reported may be determined according to a default type of PHR defined in a protocol, e.g., in the above situation, a protocol may define the second type PHR is reported because the category-2 service has higher requirements for reliability and low delay, thus the second type PHR may have priority to be reported. As for the mistaking of the type of PHR that may be caused by the method, a type indicator indicating the type of reported PHR may be added to MAC signaling for reporting the PHR. That is, the UE may not only report the PHR, but also specify the type of the PHR. The type indicator may be a one-bit indicator indicating the PHR type. As such, the UE and the base station will not mistake the type of the reported PHR.

Method Two

For a serving cell which requires report of two types of PHR, the two types of PHR are reported simultaneously.

There are the following manners of simultaneously reporting the first type PHR and the second type PHR.

Simultaneously reported are the first type PHR and the second type PHR, the maximum transmitting power Pcmax,c,1 for calculating the first type PHR and the maximum transmitting power Pcmax,c,2 for calculating the second type PHR.

The calculations may be performed for the following situations.

Situation 1:

When a PUSCH of category-1 service is transmitted in the subframe and no PUSCH of category-2 service is transmitted in the subframe, the first type PHR may be calculated as:

$$PH_{c,1}(i) = P_{CMAX,c,1}(i) - \{10 \log_{10}(M_{PUSCH,c,1}(i)) + P_{O\_PUSCH,c,1}(j) + \alpha_{c,1}(j) \cdot PL_{c,1} + \Delta_{TF,c,1}(i) + f_{c,1}(i)\} \quad [dB]$$

The $P_{CMAX,c,1}(i)$ is the maximum transmitting power in subframe i in the serving cell c of the UE when it is assumed the serving cell c only transmits PUSCH of category-1 service; and all the other parameters are power control parameters of the PUSCH for transmission of the category-1 service.

$M_{PUSCH,c,1}(i)$ is the number of physical resource blocks (PRBs) occupied by the PUSCH.

$P_{O\_PUSCH,c,1}(j)$ is a power offset configured by higher layer signaling.

$PL_{c,1}$ is path loss.

$\alpha_{c,1}(j)$ is for controlling path loss compensating rate. For Semi-persistent scheduling (SPS) PUSCH or PUSCH re-transmission, j=0; for dynamically scheduled PUSCH or PUSCH re-transmission, j=1; for PUSCH or PUSCH re-transmission scheduled for a random access response, j=2.

$f_{c,1}(i)$ is an accumulative sum of close-loop power control. $\Delta_{TF,c,1}(i)$ is a parameter in connection with a MCS of uplink transmission. Specifically, when $K_s$ equals 1.25, (i)=$10 \log_{10}((2^{BPRE \cdot k_s}-1) \cdot \beta_{offset}^{PUSCH})$. When only Aperiodic CSI (A-CSI) is transmitted and no uplink data is transmitted, BPRE=$O_{CQI}/N_{RE}$, and $\beta_{offset}^{PUSCH} = \beta_{offset}^{CQI}$. When uplink data is transmitted, $$BPRE = \sum_{r=0}^{C-1} K_r / N_{RE}, \text{ and}$$

$$\beta_{offset}^{PUSCH} = 1.$$

C is the number of code blocks in a transmission block (TB), $K_r$ is the number of bits of the r'th CB, $N_{RE}$ is the total number of resource elements (RE) in a PUSCH.

The second type PHR may be calculated as:

$$PH_{c,2}(i) = \tilde{P}_{CMAX,c,2}(i) - \{P_{O\_PUSCH,c,2}(1) + \alpha_{c,2}(1) \cdot PL_{c,2} + f_{c,2}(i)\} \quad [dB]$$

Definitions of parameters in the above formula can be found in 3rd Generation Partnership Project (3GPP) 36.213 v10.9.0 Section 5.1.1.1. The $\tilde{P}_{CMAX,c,2}(i)$ is the maximum transmitting power in subframe i in the serving cell c of the UE when it is assumed the serving cell c does not transmit PUSCH of any service. All of the other parameters are power control parameters of the PUSCH for transmission of the category-2 service.

$P_{O\_PUSCH,c,2}(1)$ is a power offset configured by higher layer signaling; $PL_{c,2}$ is path loss; $\alpha_{c,2}(1)$ is for controlling path loss compensating rate; $f_{c,2}(i)$ is an accumulative sum of close-loop power control.

Since category-2 service is not transmitted in the serving cell c, $PH_{c,2}(i)$ is a virtual PHR.

Situation 2:

When a PUSCH of category-1 service is transmitted in the subframe and no PUSCH of category-2 service is transmitted in the subframe, the second type PHR may be calculated as:

$$PH_{c,2}(i) = P_{CMAX,c,2}(i) - \{10 \log_{10}(M_{PUSCH,c,2}(i)) + P_{O\_PUSCH,c,2}(j) + \alpha_{c,2}(j) PL_{c,2} + \Delta_{TF,c,2}(i) + f_{c,2}(i)\} \quad [dB]$$

The $P_{CMAX,c,2}(i)$ is the maximum transmitting power in subframe i in the serving cell c of the UE when it is assumed the serving cell c only transmits PUSCH of category-2 service; $M_{PUSCH,c,2}(i)$ is the number of PRBs occupied by the PUSCH. $P_{O\_PUSCH,c,2}(j)$ is a power offset configured by higher layer signaling. $PL_{c,2}$ is path loss. $\alpha_{c,2}(j)$ is for controlling path loss compensating rate. $f_{c,2}(i)$ is an accumulative sum of close-loop power control; $\Delta_{TF,c,2}(i)$ is a parameter in connection with a MCS of uplink transmission. $PH_{c,2}$ (i) is a virtual PHR.

All of the other parameters are power control parameters of the PUSCH for transmission of the category-2 service.

The first type PHR may be calculated as:

$$PH_{c,1}(i) \tilde{P}_{CMAX,c,1}(i) - \{P_{O\_PUSCH,c,1}(1) + \alpha_{c,1}(1) \cdot PL_{c,1} + f_{c,1}(i)\} \quad [dB]$$

Definitions of parameters in the above formula can be found in 3rd Generation Partnership Project (3GPP) 36.213 v10.9.0 Section 5.1.1.1. The $\tilde{P}_{CMAX,c,1}(i)$ is the maximum transmitting power in subframe i in the serving cell c of the UE when it is assumed the serving cell c does not transmit PUSCH of any service. and all the other parameters are power control parameters of the PUSCH for transmission of the category-1 service.

$P_{O\_PUSCH,c,1}(1)$ is a power offset configured by higher layer signaling. $PL_{c,1}$ is path loss. $\alpha_{c,1}(1)$ is for controlling path loss compensating rate; $f_{c,1}(i)$ is an accumulative sum of close-loop power control.

Since category-1 service is not transmitted in the serving cell c, $PH_{c,1}(i)$ is a virtual PHR.

Situation 3: When the subframe does not transmit PUSCH of category-1 service or PUSCH of category-2 service, the first type PHR may be calculated as:

$$PH_{c,1}(i) = \tilde{P}_{CMAX,c,1}(i) - \{P_{O\_PUSCH,c,1}(1) + \alpha_{c,1}(1) \cdot PL_{c,1} + f_{c,1}(i)\} \quad [dB]$$

Definitions of parameters in the above formula can be found in 3rd Generation Partnership Project (3GPP) 36.213 v10.9.0 Section 5.1.1.1. The $\tilde{P}_{CMAX,c,1}$ is the maximum transmitting power in subframe i in the serving cell c of the UE when it is assumed the serving cell c does not transmit PUSCH of any service. All of the other parameters are power control parameters of the PUSCH for transmission of the category-1 service.

$P_{O\_PUSCH,c,1}(1)$ is a power offset configured by higher layer signaling. $PL_{c,1}$ is path loss. $\alpha_{c,1}(1)$ is for controlling path loss compensating rate. $f_{c,1}(i)$ is an accumulative sum of close-loop power control. $PH_{c,1}(i)$ is a pre-set virtual PHR.

The second type PHR may be calculated as:

$$PH_{c,2}(i) = \tilde{P}_{CMAX,c,2}(i) - \{P_{O\_PUSCH,c,2}(1) + \alpha_{c,2}(1) \cdot PL_{c,2} + f_{c,2}(i)\} \quad [dB]$$

Definitions of parameters in the above formula can be found in 3rd Generation Partnership Project (3GPP) 36.213 v10.9.0 Section 5.1.1.1. The $\tilde{P}_{CMAX,c,2}(i)$ is the maximum transmitting power in subframe i in the serving cell c of the UE when it is assumed the serving cell c does not transmit PUSCH of any service. All of the other parameters are power control parameters of the PUSCH for transmission of the category-2 service.

$P_{O\_PUSCH,c,2}(j)$ is a power offset configured by higher layer signaling. $PL_{c,2}$ is path loss; $\alpha\alpha_{c,2}(j)$ is for controlling path loss compensating rate. $f_{c,2}(i)$ is an accumulative sum of close-loop power control. Since category-2 service is not transmitted in the serving cell c, $PH_{c,2}(i)$ is a virtual PHR.

Situation 4

When PUSCH of category-1 service and PUSCH of category-2 service are both transmitted in the subframe, the first type PHR may be calculated as:

$$PH_{c,1}(i)=P_{CMAX,c,1}(i)-\{10\ \log_{10}(M_{PUSCH,c,1}(i))+ P_{O\_PUSCH,c,1}(j)+\alpha_{c,1}(j)\cdot PL_{c,1}+\Delta_{TF,c,1}(i)+f_{c,1}(i)\} \quad [\text{dB}]$$

The $P_{CMAX,c,1}(i)$ is the maximum transmitting power in subframe i in the serving cell c of the UE when it is assumed the serving cell c only transmits PUSCH of category-1 service. All of the other parameters are power control parameters of the PUSCH for transmission of the category-1 service.

$M_{PUSCH,c,1}(i)$ is the number of physical resource blocks (PRBs) occupied by the PUSCH. $P_{O\_PUSCH,c,1}(j)$ is a power offset configured by higher layer signaling. $PL_{c,1}$ is path loss. $\alpha_{c,1}(j)$ is for controlling path loss compensating rate. $f_{c,1}(i)$ is an accumulative sum of close-loop power control. $\Delta_{TF,c,1}(i)$ is a parameter in connection with a MSC of uplink transmission, and $PH_{c,1}(i)$ is a preset virtual PHR.

The second type PHR may be calculated as:

$$PH_{c,2}(i)=P_{CMAX,c,2}(i)-\{10\ \log_{10}(M_{PUSCH,c,2}(i))+ P_{O\_PUSCH,c,2}(j)+\alpha_{c,1}(j)\cdot PL_{c,2}+\Delta_{TF,c,2}(i)+f_{c,2}(i)\} \quad [\text{dB}]$$

The $P_{CMAX,c,2}(i)$ is the maximum transmitting power in subframe i in the serving cell c of the UE when it is assumed the serving cell c only transmits PUSCH of category-2 service. All of the other parameters are power control parameters of the PUSCH for transmission of the category-2 service.

$M_{PUSCH,c,2}(i)$ is the number of PRBs occupied by the PUSCH. $P_{O\_PUSCH,c,2}(j)$ is a power offset configured by higher layer signaling. $PH_{c,2}$ is path loss. $\alpha_{c,2}(j)$ is for controlling path loss compensating rate. $f_{c,2}(i)$ is an accumulative sum of close-loop power control. $\Delta_{TF,c,2}(i)$ is a parameter in connection with a MSC of uplink transmission, and $PH_{c,2}(i)$ is a preset virtual PHR.

Method Three

For a serving cell which requires report of two types of PHR, the two types of PHR are reported simultaneously. There are the following manners of simultaneously reporting the first type PHR and the second type PHR.

Simultaneously reported are the first type PHR and the second type PHR, the maximum transmitting power Pcmax,c,1 for calculating the first type PHR and the maximum transmitting power Pcmax,c,2 for calculating the second type PHR.

Figure 8:
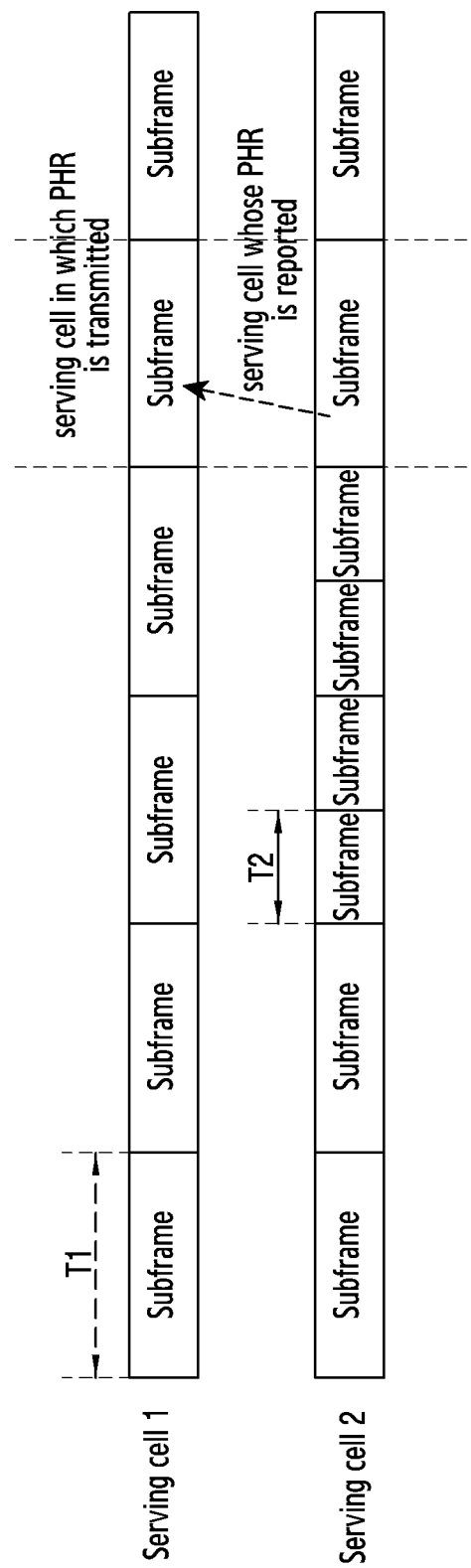
FIG. 8 is a schematic diagram illustrating a subframe length one of a plurality of serving cells of a UE of method three in accordance with embodiment two of the present disclosure.
Figure 9:
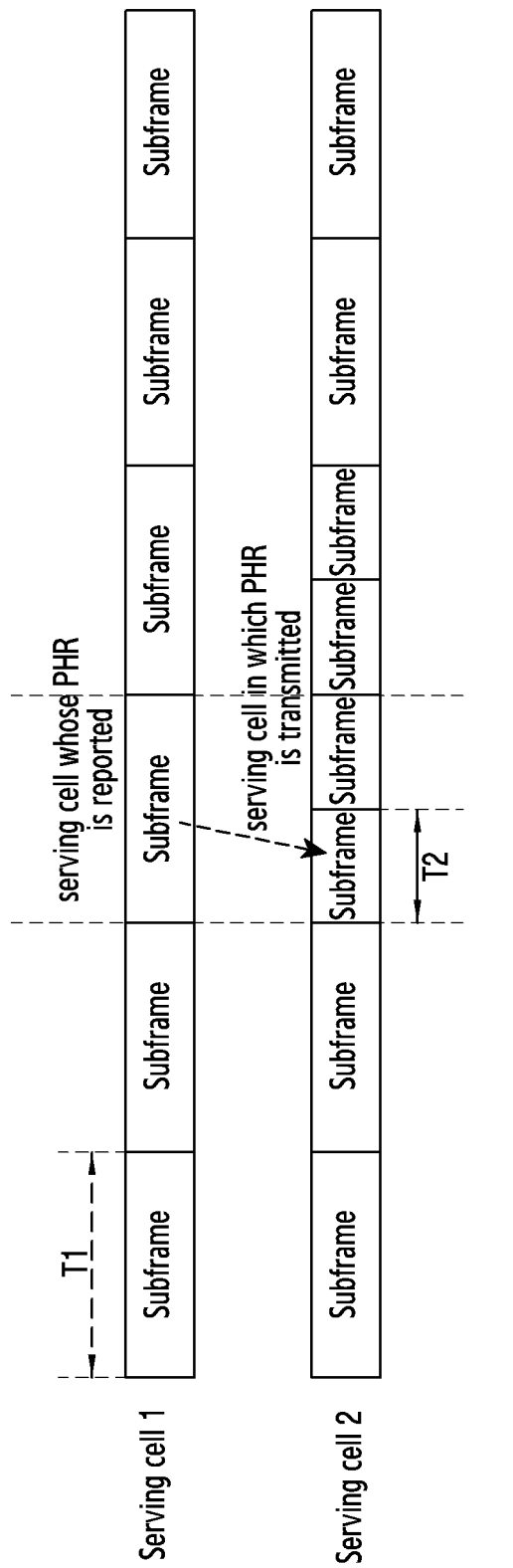
FIG. 9 is a schematic diagram illustrating a subframe length two of a plurality of serving cells of a UE of method three in accordance with embodiment two of the present disclosure.

When a serving cell selected by the UE for transmitting PHR has the same subframe length with a serving cell whose PHR is reported, the situation is as shown in FIG. 8. FIG. 8 is a schematic diagram illustrating a subframe length one of a plurality of serving cells of a UE of method three in accordance with embodiment two of the present disclosure. PHR of serving cell 2 is transmitted in PUSCH of serving cell 1, and the subframe of serving cell 1 for transmitting the PHR has the same subframe length with the subframe of serving cell 2 for calculating the PHR. In another example, when a serving cell for which PHR is selected to be transmitted by the UE has the same subframe length with that of a serving cell to which the PHR is reported, the situation is as shown in FIG. 9. FIG. 9 is a schematic diagram illustrating a subframe length two of a plurality of serving cells of a UE of method three in accordance with embodiment two of the present disclosure. PHR of serving cell 1 is transmitted in PUSCH of serving cell 2, and the subframe of serving cell 2 for transmitting the PHR has the same subframe length with the subframe of serving cell 1 for calculating the PHR. In the above two situations, since the serving cell having the longer subframe length has a longer time interval from receiving an instruction of scheduling PUSCH to sending the PUSCH than the serving cell having the shorter subframe length, the UE has enough time after receiving the scheduling instruction to calculate the PHR of the serving cell having the shorter subframe length and then transmits the PHR, the UE may use the following method to report the two types of PHR.

When a PUSCH of category-1 service is transmitted in the subframe and no PUSCH of category-2 service is transmitted in the subframe, the first type PHR may be calculated as:

$$PH_{c,1}(i)=P_{CMAX,c,1}(i)-\{10\ \log_{10}(M_{PUSCH,c,1}(i))+ P_{O\_PUSCH,c,1}(j)+\alpha_{c,1}(j)\cdot PL_{c,1}+\Delta_{TF,c,1}(i)+f_{c,1}(i)\} \quad [\text{dB}]$$

The $P_{CMAX,c,1}(i)$ is the maximum transmitting power in subframe i in the serving cell c of the UE when it is assumed the serving cell c only transmits PUSCH of category-1 service. All of the other parameters are power control parameters of the PUSCH for transmission of the category-1 service.

$M_{PUSCH,c,1}(i)$ is the number of PRBs occupied by the PUSCH. $P_{O\_PUSCH,c,1}(j)$ is a power offset configured by higher layer signaling. $PL_{c,1}$ is path loss. $\alpha_{c,1}(j)$ is for controlling path loss compensating rate. $f_{c,1}(i)$ is an accumulative sum of close-loop power control. $\Delta_{TF,c,1}(i)$ is a parameter in connection with a MSC of uplink transmission, and $PH_{c,1}(i)$ is a preset virtual PHR.

The second type PHR may be calculated as:

$$PH_{c,2}(i)=\tilde{P}_{CMAX,c,2}(i)-\{P_{O\_PUSCH,c,2}(1)+\alpha_{c,2}(1)\cdot PL_{c,2}+f_{c,2}(i)\} \quad [\text{dB}]$$

Definitions of parameters in the above formula can be found in 3rd Generation Partnership Project (3GPP) 36.213 v10.9.0 Section 5.1.1.1. The $\tilde{P}_{CMAX,c,2}(i)$ is the maximum transmitting power in subframe i in the serving cell c of the UE when it is assumed the serving cell c does not transmit PUSCH of any service. All of the other parameters are power control parameters of the PUSCH for transmission of the category-2 service. $PH_{c,2}(i)$ is a virtual PHR.

$P_{O\_PUSCH,c,2}(1)$ is a power offset configured by higher layer signaling. $PL_{c,2}$ is path loss. $\alpha_{c,2}(1)$ is for controlling path loss compensating rate; $f_{c,2}(i)$ is an accumulative sum of close-loop power control. $PH_{c,2}(i)$ is a pre-set virtual PHR.

When a PUSCH of category-2 service is transmitted in the subframe and no PUSCH of category-1 service is transmitted in the subframe, The second type PHR may be calculated as:

$$PH_{c,2}(i)=P_{CMAX,c,2}(i)-\{10\ \log_{10}(M_{PUSCH,c,2}(i))+ P_{O\_PUSCH,c,2}(j)+\alpha_{c,2}(j)\cdot PL_{c,2}+\Delta_{TF,c,2}(i)+f_{c,2}(i)\} \quad [\text{dB}]$$

The $P_{CMAX,c,2}(i)$ is the maximum transmitting power in subframe i in the serving cell c of the UE when it is assumed the serving cell c only transmits PUSCH of category-2 service. All of the other parameters are power control parameters of the PUSCH for transmission of the category-2 service.

$M_{PUSCH,c,2}(i)$ is the number of PRBs occupied by the PUSCH. $P_{O\_PUSCH,c,2}(j)$ is a power offset configured by higher layer signaling. $PL_{c,2}$ is path loss. $\alpha_{c,2}(j)$ is for controlling path loss compensating rate. $f_{c,2}(i)$ is an accumulative sum of close-loop power control. $\Delta_{TF,c,2}(i)$ is a parameter in connection with a MCS of uplink transmission. $PH_{c,2}(i)$ is a virtual PHR.

The first type PHR may be calculated as:

$$PH_{c,1}(i) = \tilde{P}_{CMAX,c,1}(i) - \{P_{O\_PUSCH,c,1}(1) + \alpha_{c,1}(1) \cdot PL_{c,1} + f_{c,1}(i)\} \quad [dB]$$

Definitions of parameters in the above formula can be found in 3rd Generation Partnership Project (3GPP) 36.213 v10.9.0 Section 5.1.1.1. The $\tilde{P}_{CMAX,c,1}(i)$ is the maximum transmitting power in subframe i in the serving cell c of the UE when it is assumed the serving cell c does not transmit PUSCH of any service. All of the other parameters are power control parameters of the PUSCH for transmission of the category-1 service. $PH_{c,1}(i)$ is a virtual PHR.

$P_{O\_PUSCH,c,1}(1)$ is a power offset configured by higher layer signaling. $PL_{c,1}$ is path loss. $\alpha_{c,1}(1)$ is for controlling path loss compensating rate; $f_{c,1}(i)$ is an accumulative sum of close-loop power control. $PH_{c,1}(i)$ is a pre-set virtual PHR.

When no PUSCH of category-1 service nor PUSCH of category-2 service is transmitted in the subframe, the first type PHR may be calculated as:

$$PH_{c,1}(i) = \tilde{P}_{CMAX,c,1}(i) - \{P_{O\_PUSCH,c,1}(1) + \alpha_{c,1}(1) \cdot PL_{c,1} + f_{c,1}(i)\} \quad [dB]$$

Definitions of parameters in the above formula can be found in 3rd Generation Partnership Project (3GPP) 36.213 v10.9.0 Section 5.1.1.1. The $\tilde{P}_{CMAX,c,1}(i)$ is the maximum transmitting power in subframe i in the serving cell c of the UE when it is assumed the serving cell c does not transmit PUSCH of any service. All of the other parameters are power control parameters of the PUSCH for transmission of the category-1 service. $PH_{c,1}(i)$ is a virtual PHR.

$P_{O\_PUSCH,c,1}(1)$ is a power offset configured by higher layer signaling. $PL_{c,1}$ is path loss. $\alpha_{c,1}(1)$ is for controlling path loss compensating rate; $f_{c,1}(i)$ is an accumulative sum of close-loop power control. $PH_{c,1}(i)$ is a pre-set virtual PHR.

The second type PHR may be calculated as:

$$PH_{c,2}(i) = \tilde{P}_{CMAX,c,2}(i) - \{P_{O\_PUSCH,c,2}(1) + \alpha_{c,2}(1) \cdot PL_{c,2} + f_{c,2}(i)\} \quad [dB]$$

Definitions of parameters in the above formula can be found in 3rd Generation Partnership Project (3GPP) 36.213 v10.9.0 Section 5.1.1.1. The $\tilde{P}_{CMAX,c,2}(i)$ is the maximum transmitting power in subframe i in the serving cell c of the UE when it is assumed the serving cell c does not transmit PUSCH of any service. All of the other parameters are power control parameters of the PUSCH for transmission of the category-2 service. $PH_{c,2}(i)$ is a virtual PHR.

$P_{O\_PUSCH,c,2}(j)$ is a power offset configured by higher layer signaling. $PL_{c,2}$ is path loss. $\alpha_{c,2}(j)$ is for controlling path loss compensating rate. $f_{c,2}(i)$ is an accumulative sum of close-loop power control; and $PH_{c,2}(i)$ is a virtual PHR.

When PUSCH of category-1 service and PUSCH of category-2 service are both transmitted in the subframe, the first type PHR may be calculated as:

$$PH_{c,1}(i) = P_{CMAX,c,1}(i) - \{10 \log_{10}(M_{PUSCH,c,1}(i)) + P_{O\_PUSCH,c,1}(j) + \alpha_{c,1}(j) \cdot PL_{c,1} + \Delta_{TF,c,1}(i) + f_{c,1}(i)\} \quad [dB]$$

The $P_{CMAX,c,1}(i)$ is the maximum transmitting power in subframe i in the serving cell c of the UE when it is assumed the serving cell c only transmits PUSCH of category-1 service. All of the other parameters are power control parameters of the PUSCH for transmission of the category-1 service.

$M_{PUSCH,c,1}(i)$ is the number of PRBs occupied by the PUSCH. $P_{O\_PUSCH,c,1}(j)$ is a power offset configured by higher layer signaling. $PL_{c,1}$ is path loss. $\alpha_{c,1}(j)$ is for controlling path loss compensating rate. $f_{c,1}(i)$ is an accumulative sum of close-loop power control. $\Delta_{TF,c,1}(i)$ is a parameter in connection with a MCS of uplink transmission, and $PH_{c,1}(i)$ is a preset virtual PHR.

The second type PHR may be calculated as:

$$PH_{c,2}(i) = P_{CMAX,c,2}(i) - \{10 \log_{10}(M_{PUSCH,c,2}(i)) + P_{O\_PUSCH,c,2}(j) + \alpha_{c,2}(j) \cdot PL_{c,2} + \Delta_{TF,c,2}(i) + f_{c,2}(i)\} \quad [dB]$$

The $P_{CMAX,c,2}(i)$ is the maximum transmitting power in subframe i in the serving cell c of the UE when it is assumed the serving cell c only transmits PUSCH of category-2 service. All of the other parameters are power control parameters of the PUSCH for transmission of the category-2 service.

$M_{PUSCH,c,2}(i)$ is the number of PRBs occupied by the PUSCH. $P_{O\_PUSCH,c,2}(j)$ is a power offset configured by higher layer signaling. $PH_{c,2}$ is path loss. $\alpha_{c,2}(j)$ is for controlling path loss compensating rate. $f_{c,2}(i)$ is an accumulative sum of close-loop power control. $\Delta_{TF,c,2}(i)$ is a parameter in connection with a MCS of uplink transmission, and $PH_{c,2}(i)$ is a preset virtual PHR.

Figure 10:
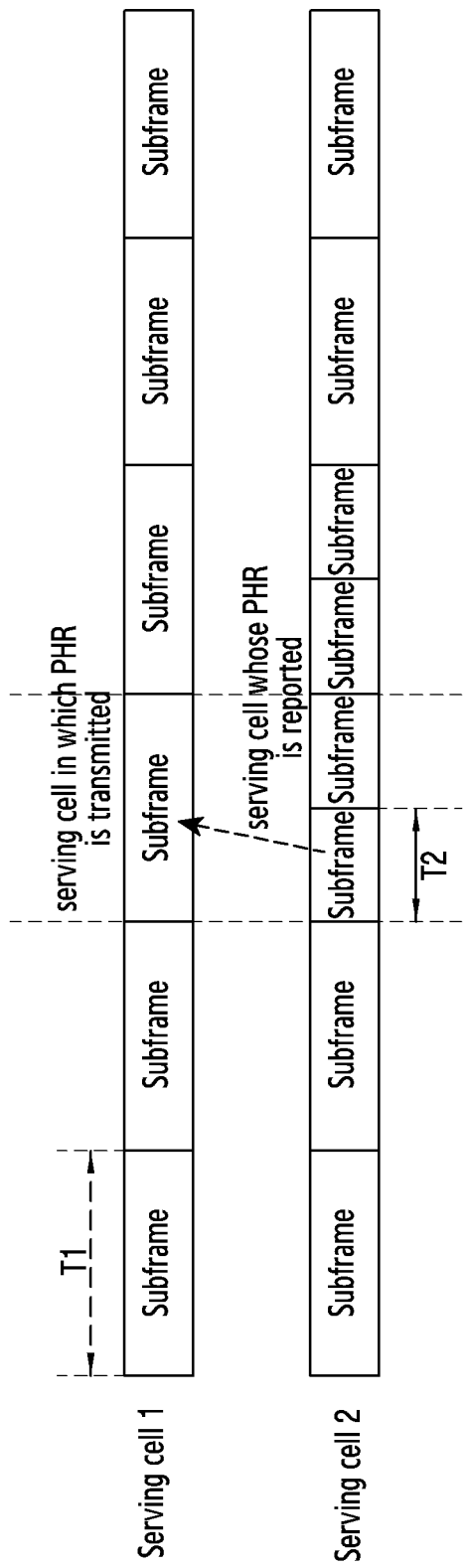
FIG. 10 is a schematic diagram illustrating a subframe length three of a plurality of serving cells of a UE of method three in accordance with embodiment two of the present disclosure.

When a serving cell for which PHR is selected to be transmitted by the UE has a larger subframe length than that of a serving cell to which the PHR is reported, the situation is as shown in FIG. 10. FIG. 10 is a schematic diagram illustrating a subframe length three of a plurality of serving cells of a UE of method three in accordance with embodiment two of the present disclosure. PHR of serving cell 2 is transmitted in PUSCH of serving cell 1, and the subframe of serving cell 1 for transmitting the PHR has a larger subframe length than the subframe of serving cell 1 for calculating the PHR. In the above situation, since the serving cell having the longer subframe length has a longer time interval from receiving an instruction of scheduling PUSCH to sending the PUSCH than the serving cell having the shorter subframe length, the UE may have not enough time after receiving the scheduling instruction from the serving cell having the shorter subframe length to calculate the PHR according to the scheduling condition of the shorter subframe and then transmits the PHR in the serving cell having the longer subframe length because operations such as coding or the like for the serving cell having longer subframes are more time-consuming. If the UE has enough time to calculate PHR after receiving a scheduling command from a serving cell having the shorter subframe and transmits the PHR in the serving cell having the longer subframe, the above method may be used, i.e., the method of calculating the two types of PHR when the serving cell for which PHR is selected to be transmitted by the UE has the same subframe length with that of a serving cell to which the PHR is reported. If the UE does not have enough time to calculate PHR according to scheduling condition of the shorter subframe after receiving a scheduling command from the serving cell having the shorter subframe and transmits the PHR in the serving cell having the longer subframe, the UE may report the two types of PHR according to the following method.

When a PUSCH of category-1 service is transmitted in the subframe and no PUSCH of category-2 service is transmitted in the subframe, or when no PUSCH of category-1 service nor PUSCH of category-2 service is transmitted in the subframe, when a PUSCH of category-1 service and a PUSCH of category-2 service are both transmitted in the subframe, when no PUSCH of category-1 service nor PUSCH of category-2 service is transmitted in the subframe, the first type PHR may be calculated as:

$$PH_{c,1}(i)=\tilde{P}_{CMAX,c,1}(i)-\{P_{O\_PUSCH,c,1}(1)+\alpha_{c,1}(1)\cdot PL_{c,1}+f_{c,1}(i)\} \quad [dB]$$

Definitions of parameters in the above formula can be found in 3rd Generation Partnership Project (3GPP) 36.213 v10.9.0 Section 5.1.1.1. $\tilde{P}_{CMAX,c,2}(i)$ is the maximum transmission power on subframe i in the serving cell c of the UE when it is assumed the serving cell c does not transmit PUSCH of any service, and $P_{O\_PUSCH,c,1}(1)$ is a power offset configured by higher layer signaling. $PL_{c,1}$ is path loss. $\alpha_{c,1}(1)$ is for controlling path loss compensating rate; $f_{c,1}(i)$ is an accumulative sum of close-loop power control. $PH_{c,1}(i)$ is a pre-set virtual PHR.

The second type PHR may be calculated as:

$$PH_{c,2}(i)=\tilde{P}_{CMAX,c,2}(i)-\{P_{O\_PUSCH,c,2}(1)+\alpha_{c,2}(1)\cdot PL_{c,2}+f_{c,2}(i)\} \quad [dB]$$

Definitions of parameters in the above formula can be found in 3rd Generation Partnership Project (3GPP) 36.213 v10.9.0 Section 5.1.1.1. $\tilde{P}_{CMAX,c,2}(i)$ is the maximum transmission power on subframe i in the serving cell c of the UE when it is assumed the serving cell c does not transmit PUSCH of any service, and $P_{O\_PUSCH,c,2}(1)$ is a power offset configured by higher layer signaling. $PL_{c,2}$ is path loss. $\alpha_{c,2}(j)$ is for controlling path loss compensating rate. $f_{c,2}(i)$ is an accumulative sum of close-loop power control; and $PH_{c,2}(i)$ is a virtual PHR.

Embodiment Three

This embodiment provides a method of transmitting PHR for plural serving cells configured for a UE. In the embodiment, at least two of the serving cells have different timeslot lengths, or different frequency bands or different time have different timeslot lengths within a serving cell.

Figure 11:
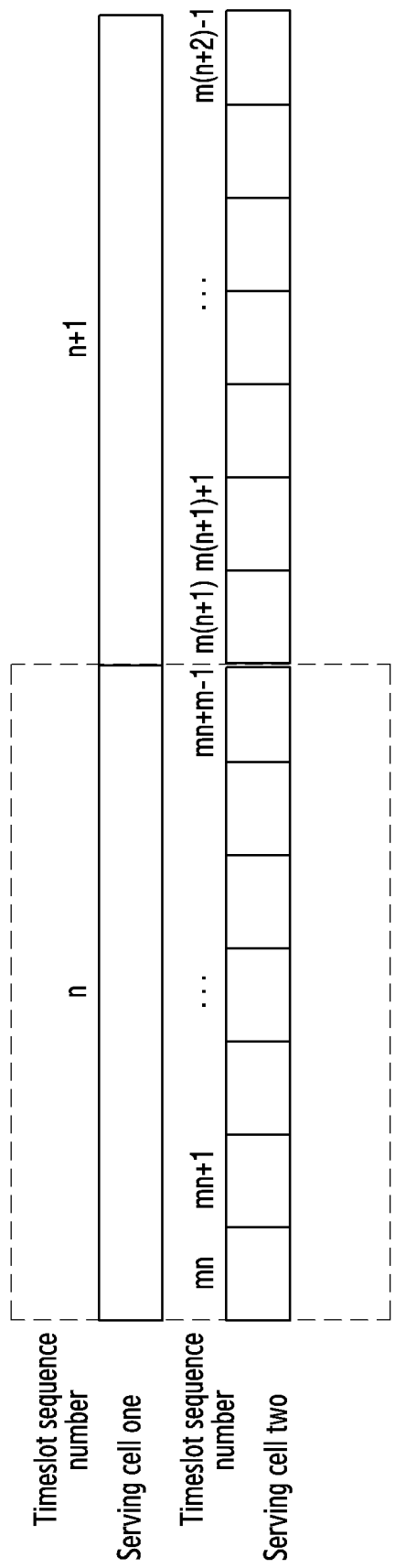
FIG. 11 is a schematic diagram illustrating timeslots with timeslot length one of plural serving cells of a UE in accordance with method three of embodiment three of the present disclosure.

In the above two situations, supposing within a reference timeslot for reporting PHR, some serving cells have one timeslot, i.e., the timeslot length of the serving cell is the same with the reference timeslot, or some serving cells have more than one timeslot, i.e., the timeslot length of the serving cell is shorter than that of the reference timeslot. For example, as shown in FIG. 11, a UE is configured with two serving cells, among which serving cell 1 has a timeslot length T and serving cell 2 has a timeslot length of T/m, T is the length of the reference timeslot for reporting PHR.

When the serving cell has the same timeslot length with the reference timeslot, the UE may calculate PHR according to information of PUSCH in the serving cell within timeslot n when the UE is to report PHR in reference timeslot n.

When the serving cell has a shorter timeslot length than that of the reference timeslot, i.e., when reporting PHR in reference timeslot n, the UE reports PHR in plural timeslots of the serving cell. For example, the serving cell may have m timeslots, including timeslots m*n, m*n+1, . . . , m*n+m−1, within reference timeslot n. The m timeslots may have different PUSCH scheduling conditions, and the UE may select PUSCH transmission information of one of the timeslots for the PHR. The following are some of methods of selecting PUSCH transmission information of one of the timeslots for calculating PHR, in which the value of m is obtained by the UE through an explicit manner or an inexplicit manner.

Method One:

The selected timeslot for PHR calculation is the first timeslot in which PUSCH is scheduled in the timeslots of the serving cell within the reference timeslot, and the UE has enough time to calculate the PHR using information of the scheduled PUSCH after receiving the scheduling command. In some examples, when the UE does not have enough time to calculate the PHR using information of the scheduled PUSCH after receiving the scheduling command, virtual PHR may be used. The virtual PHR refers to PHR calculated for no PUSCH transmission. In some other examples, when there is no PUSCH transmission in all of the timeslots in the reference timeslots for reporting PHR, the virtual PHR may be used.

Figure 12:
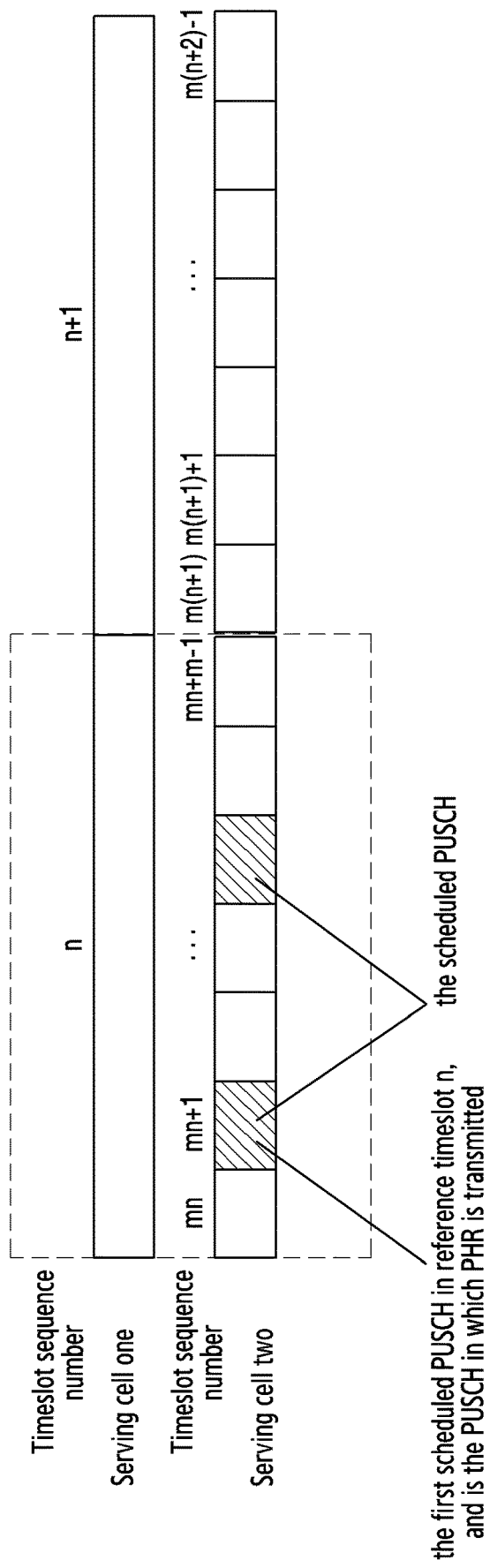
FIG. 12 is a schematic diagram illustrating timeslots with timeslot length one of plural serving cells of a UE in accordance with method one of embodiment three of the present disclosure.
Figure 13:
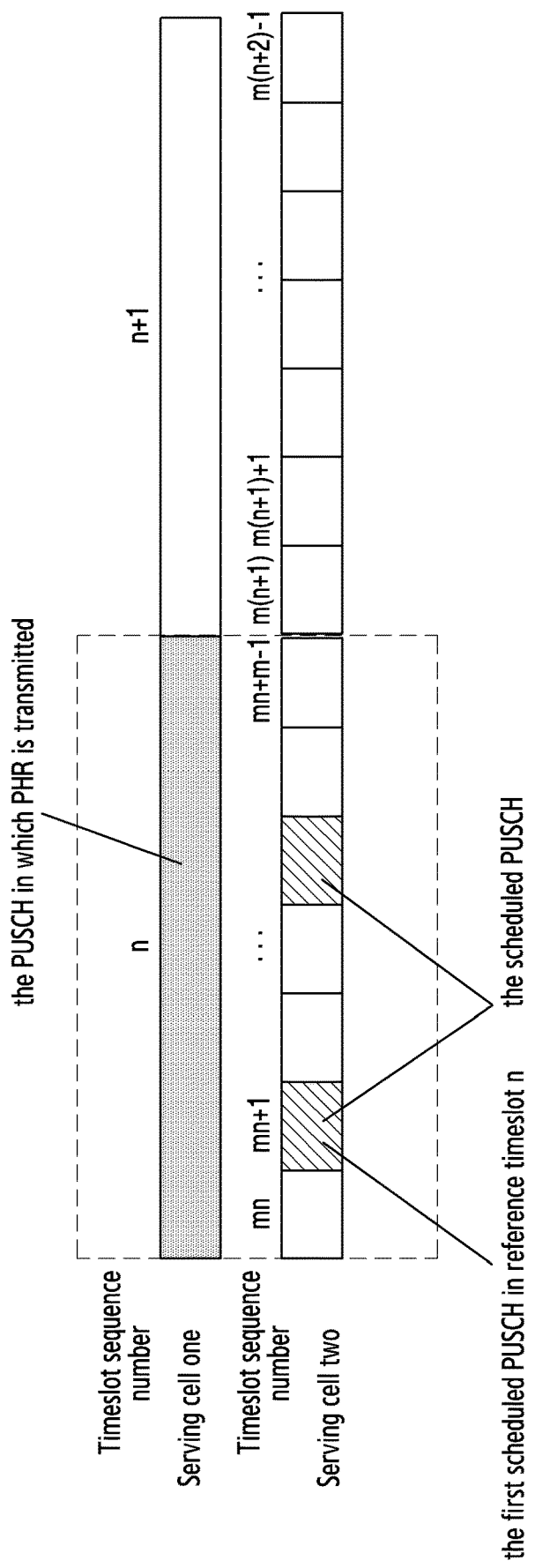
FIG. 13 is a schematic diagram illustrating timeslots with timeslot length two of plural serving cells of a UE in accordance with method one of embodiment three of the present disclosure.

For example, a UE is configured with two serving cells, in which serving cell one has the same timeslot length T with the reference timeslot and serving cell two has a timeslot length of T/m. The serving cell two has a total of m timeslots, i.e., timeslots m*n, m*n+1, m*n+m−1, in reference timeslot n. The first scheduled PUSCH is in timeslot m*n+1. When PHR is transmitted in PUSCH in timeslot m*n+1 of serving cell two, the UE has enough time to calculate the PHR according to information of the PUSCH scheduled in the timeslot m*n+1, thus the UE calculates the PHR according to information of the PUSCH scheduled in the timeslot m*n+1, as shown in FIG. 12. When PHR is transmitted in PUSCH in timeslot n of serving cell one, the UE may not have enough time to calculate PHR according to information of the PUSCH scheduled in timeslot m*n+1 of serving cell two because the PUSCH for transmitting the PHR starts early, thus the PHR of the serving cell two is the virtual PHR calculated according to there is no PUSCH transmission in serving cell two, as shown in FIG. 13.

Method Two:

The selected timeslot for calculating PHR is the last timeslot in which PUSCH is scheduled among timeslots of the serving cell that fall within the reference timeslot and which satisfies that the UE has enough time to calculate the PHR according to information of the scheduled PUSCH after receiving the scheduling command. In some examples, when the UE does not have enough time to calculate the PHR using information of the scheduled PUSCH after receiving the scheduling command, virtual PHR may be used. The virtual PHR refers to PHR calculated for no PUSCH transmission. In some other examples, when there is no PUSCH transmission in all of the timeslots in the reference timeslots for reporting PHR, the virtual PHR may be used.

For example, a UE is configured with two serving cells, in which serving cell one has the same timeslot length T with the reference timeslot and serving cell two has a timeslot length of T/m. The serving cell two has timeslots m*n, m*n+1, m*n+m−1 that fall within reference timeslot n. The first scheduled PUSCH is in timeslot m*n+1. When PHR is transmitted in PUSCH in timeslot m*n+1 of serving cell two, the UE has enough time to calculate the PHR according to information of the PUSCH scheduled in the timeslot m*n+1, thus the UE calculates the PHR according to information of the PUSCH scheduled in the timeslot m*n+1, as shown in FIG. 12. When PHR is transmitted in PUSCH in timeslot n of serving cell one, the UE may not have enough time to calculate PHR according to information of the PUSCH scheduled in timeslot m*n+1 of serving cell two because the PUSCH for transmitting the PHR starts early, thus the PHR of the serving cell two is the virtual PHR calculated according to there is no PUSCH transmission in serving cell two, as shown in FIG. 13.

Method Three:

The selected timeslot for calculating PHR is the first timeslot among timeslots of the serving cell that fall within the reference timeslot. When the UE transmits PUSCH in the first timeslot of the serving cell and the UE has enough time to calculate the PHR using information of the scheduled PUSCH after receiving the scheduling command, the UE calculates the PHR using information of PUSCH transmission in the first timeslot of the serving cell; otherwise, virtual PHR may be used.

For example, a UE is configured with two serving cells, in which serving cell one has the same timeslot length T with the reference timeslot and serving cell two has a timeslot length of T/m. The serving cell two has timeslots m*n, m*n+1, m*n+m−1 that fall within reference timeslot n. When PUSCH is transmitted in the first timeslot m*n of serving cell two and the UE transmits PHR in the PUSCH which is transmitted in timeslot m*n of serving cell two, the UE has enough time to calculate the PHR according to information of the PUSCH scheduled in the timeslot m*n, thus the UE calculates the PHR according to information of the PUSCH scheduled in the timeslot m*n. When PHR is transmitted in PUSCH in timeslot n of serving cell one, the UE may not have enough time to calculate PHR according to information of the PUSCH scheduled in timeslot m*n of serving cell two, or the UE does not transmit PUSCH in the timeslot m*n of serving cell two, the PHR of the serving cell two is the virtual PHR calculated according to there is no PUSCH transmission in serving cell two.

Method Four:

The selected timeslot for calculating PHR is the last timeslot among timeslots of the serving cell that fall within the reference timeslot. When the UE transmits PUSCH in the last timeslot of the serving cell and the UE has enough time to calculate the PHR using information of the scheduled PUSCH after receiving the scheduling command, the UE calculates the PHR using information of PUSCH transmission in the last timeslot of the serving cell; otherwise, virtual PHR may be used.

For example, a UE is configured with two serving cells, in which serving cell one has the same timeslot length T with the reference timeslot and serving cell two has a timeslot length of T/m. The serving cell two has timeslots m*n, m*n+1, m*n+m−1 that fall within reference timeslot n. When PUSCH is transmitted in the last timeslot m*n+m−1 of serving cell two and the UE transmits PHR in the PUSCH which is transmitted in the timeslot m*n+m−1 of serving cell two, the UE has enough time to calculate the PHR according to information of the PUSCH scheduled in the timeslot m*n+m−1, thus the UE calculates the PHR according to information of the PUSCH scheduled in the timeslot m*n+m−1. When PHR is transmitted in PUSCH in timeslot n of serving cell one, the UE may not have enough time to calculate PHR according to information of the PUSCH scheduled in timeslot m*n+m−1 of serving cell two, or the UE does not transmit PUSCH in the timeslot m*n+m−1 of serving cell two, the PHR of the serving cell two is the virtual PHR calculated according to there is no PUSCH transmission in serving cell two.

Method Five:

The selected timeslot for calculating PHR is a timeslot determined according to an implementation manner among timeslots of the serving cell that fall within the reference timeslot for reporting PHR. PUSCHs in different timeslots may schedule different numbers of physical resource blocks (PRBs), thus the number of PRBs assumed by the UE and the base station to be scheduled may be different when calculating the PHR, and the base station and the UE may have different understanding about the remaining power. The UE may calculate PHR according to the number of PRBs obtained from configurations received from higher layer signaling or according to a number of PRBs pre-defined in a protocol instead of according to the number of PRBs actually scheduled by the UE. As such, the UE and the base station will not have different numbers of PRBs assumed to be scheduled in PHR calculation. By calculating the PHR according to the number of PRBs determined according to the above method, the base station may calculate the remaining power according to the PHR. For example, when the UE schedules 2 PRBs for PUSCH transmission in timeslot 1, and schedules 3 PRBs for PUSCH transmission in timeslot 2, the UE may calculates the PHR by using 1 PRB which is the pre-defined number of scheduled PRBs.

Method Six:

When a serving cell has a shorter timeslot length than the reference timeslot for reporting PHR, the PHR of the serving cell is virtual PHR.

Figure 14:
FIG. 14 is a schematic diagram illustrating modules of PHR apparatus in accordance with embodiments of the present disclosure.

FIG. 14 is a schematic diagram illustrating modules of PHR apparatus in accordance with embodiments of the present disclosure. The apparatus may include: a determining unit, a calculating unit and a transmitting unit.

The determining unit is for determining a PHR reporting manner according to a structure of an uplink subframe in an active serving cell;

the calculating module is for calculating the PHR according to the PHR reporting manner; and the transmitting unit is for transmitting the calculated PHR to a base station.

Figure 15:
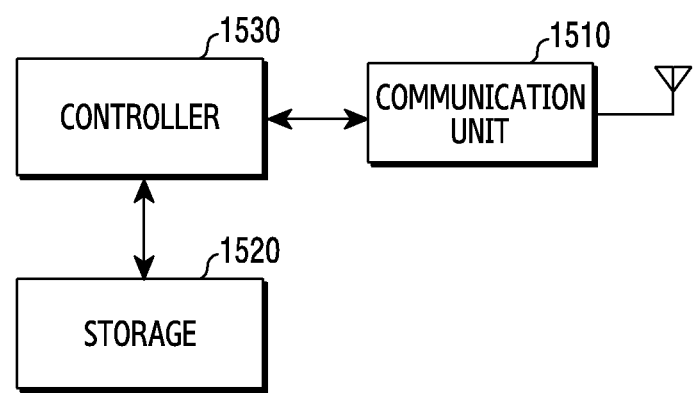
FIG. 15 is a schematic diagram illustrating an example configuration of a terminal in a wireless communication system according to an exemplary embodiment of the disclosure.

FIG. 15 is a schematic diagram illustrating an example configuration of a terminal in a wireless communication system according to an exemplary embodiment of the disclosure. FIG. 15 illustrates an example of a configuration of the terminal. Hereinafter, the term "unit" or the term ending with the suffix "-er" or "-or" refer to a unit for processing at least one function or operation and these terms may be implemented by using hardware or software or a combination of hardware and software.

Referring to FIG. 3, the terminal includes a communication interface 1510, a storage 1520, and a controller 1530.

The communication interface 1510 performs functions for transmitting and receiving signals via a radio channel. For example, the communication interface 1510 performs a function of converting between a baseband signal and a bit string according to a physical layer standard of a system. For example, when transmitting data, the communication interface 1510 generates complex symbols by encoding and modulating a transmission bit string. In addition, when receiving data, the communication interface 1510 restores a reception bit string by demodulating and decoding a baseband signal. In addition, the communication interface 1510 up-converts a baseband signal into an RF band signal and then transmit the RF band signal through an antenna, and down-converts an RF band signal received through the antenna into a baseband signal. For example, the communication interface 1510 may include a transmission filter, a reception filter, an amplifier, a mixer, an oscillator, a DAC, an ADC, or the like.

The communication interface 1510 may include a plurality of transmission/reception paths. The communication interface 1510 may include at least one antenna array configured by a plurality of antenna elements. In view of hardware, the communication interface 1510 may be configured by a digital circuitry and an analog circuitry (e.g., radio frequency integrated circuit (RFIC)). Here, the digital circuitry and analog circuitry may be implemented as one package. Also, the communication interface 1510 may include a plurality of RF chain. The communication interface 1510 may perform beamforming.

Also, the communication interface 1510 may include different communication modules for processing signals of different frequency band. The communication interface 1510 may include a plurality of communication modules for supporting a plurality of different wireless access technologies. For example, the plurality of different wireless access technologies may include Bluetooth low energy (BLE), wireless fidelity (Wi-Fi), Wi-Fi gigabyte (WiGig), cellular network (e.g., long term evolution (LTE)), or the like. Also, different frequency bands may include super high frequency (SHF)(e.g., 2.5 GHz, 5 GHz) band and millimeter wave (e.g., 60 GHz).

The wireless communication interface 1510 transmits and receives signals as described above. Accordingly, the communication interface 1510 may be referred to as a transmission interface, a reception interface, a transmission and reception interface, a transmitter, a receiver or a transceiver. In addition, in the following description, transmitting and receiving performed through a radio channel may include processing by the communication interface 1510 as described above.

The storage 1520 stores data such as a basic program for the operation of the terminal, an application program, setting information, or the like. The storage 1510 may be configured by a volatile memory, a nonvolatile memory, or a combination of a volatile memory and a nonvolatile memory. In addition, the storage 1520 provides stored data in response to a request of the controller 330.

The controller 1530 controls overall operations of the terminal. For example, the controller 1530 transmits and receives signals through the communication interface 1510. In addition, the controller 1530 records and reads data on and from the storage 1520. The controller 1530 may perform functions of a protocol stack which the communication standard requires. To achieve this, the controller 1530 may include at least one processor or microprocessor or may be a part of the processor. In addition, a part of the communication interface 1510 and the controller 1530 may be referred to as a communication processor (CP).

According to exemplary embodiments of the present disclosure, the controller 1530 may determine a PHR reporting manner according to a structure of an uplink subframe in an active serving cell, determine PHR according to the PHR reporting manner, and transmit the PHR to a base station. For example, the controller 330 may control the terminal to perform operations according to the exemplary embodiments of the present disclosure.

The purpose, technical solution and merits of this invention have been further described in detail by the above mentioned embodiments. It should be appreciated that the foregoing is only embodiments of this invention and is not for use in limiting the invention. Any modification, equivalent substitution, improvement within the spirit and principle of the invention should be covered in the protection scope of the invention.

The invention claimed is:

1. A method performed by a terminal in a wireless communication system, the method comprising:
   identifying first information for indicating a slot length of a first serving cell for a physical uplink shared channel (PUSCH) transmission associated with a first sub-carrier spacing;
   identifying second information for indicating a slot length of a second serving cell for a PUSCH transmission associated with a second sub-carrier spacing different from the first sub-carrier spacing, wherein the slot length of the first serving cell is longer than the slot length of the second serving cell;
   identifying a first slot of multiple slots of the second serving cell that fully overlaps with a slot of the first serving cell, based on the first information and the second information; and
   transmitting, in the slot of the first serving cell, a power headroom report (PHR) for the first slot of the second serving cell to a base station,
   wherein the slot of the first serving cell overlaps with the multiple slots of the second serving cell, and
   wherein the first slot of the second serving cell that is located at first among slots that fully overlap with the slot of the first serving cell.

2. The method of claim 1, wherein the identifying of the first slot of the multiple slots of the second serving cell comprises:
   identifying that the terminal is configured with a plurality of cells including the first serving cell and the second serving cell; and
   identifying the first serving cell based on the first information and the second information.

3. The method of claim 2, wherein the identifying of the first slot of the multiple slots of the second serving cell comprises:
   identifying the slot of the identified first serving cell to provide a PHR, that overlaps with the multiple slots of the second serving cell.

4. The method of claim 1, further comprising:
   receiving, via a higher layer signaling, a first configuration comprising the first information; and
   receiving, via a higher layer signaling, a second configuration comprising the second information,
   wherein the PHR is transmitted based on physical uplink shared channel (PUSCH).

5. The method of claim 1, further comprising:
   determining a power headroom (PH) in the PHR based on a calculation method,
   wherein the calculation method is determined as one of:
   a first calculation method to determine the PH based on downlink control information (DCI) for scheduling a physical uplink shared channel (PUSCH) transmission, or
   a second calculation method to determine the PH based on a default configuration.

6. The method of claim 5, further comprising:
   determining whether the PUSCH transmission is scheduled or not according to whether the DCI is received or not;
   if it is determined that the PUSCH transmission is scheduled, determining the calculation method as the first calculation method; and
   if it is determined that the PUSCH transmission is not scheduled, determining the calculation method as the second calculation method.

7. The method of claim 5,
   wherein, if the calculation method is determined as the first calculation method, the PH is determined based on:
   a maximum transmitting power,
   a power offset,
   a compensating rate,
   a path loss set, an accumulative value for power control, and
a number of physical resource blocks (PRBs) for the PUSCH transmission obtained by the DCI, and
wherein, if the calculation method is determined as the second calculation method, the PH is determined based on:
a maximum transmitting power set by the default configuration,
a power offset set by the default configuration,
a compensating rate set by the default configuration,
a path loss set by the default configuration, and
an accumulative value for power control set by the default configuration.

8. A method performed by a base station in a wireless communication system, the method comprising:
transmitting, to a terminal, first information for indicating a length of a slot of a first serving cell for a physical uplink shared channel (PUSCH) transmission associated with a first sub-carrier spacing;
transmitting, to the terminal, second information for indicating a length of a slot of a second serving cell, wherein the slot length of the first serving cell is longer than the slot length of the second serving cell for a PUSCH transmission associated with a second sub-carrier spacing different from the first sub-carrier spacing; and
receiving, in a slot of the first serving cell, a power headroom report (PHR) for a first slot of multiple slots of the second serving cell that fully overlaps with the slot of the first serving cell from the terminal,
wherein the first slot of the second serving cell is identified based on the first information and the second information,
wherein the slot of the first serving cell overlaps with the multiple slots of the second serving cell, and
wherein the first slot of the second serving cell that is located at first among slots that fully overlap with the slot of the first serving cell.

9. The method of claim 8,
wherein the first information is transmitted via a higher layer signaling,
wherein the second information is transmitted via a higher layer signaling, and
wherein the PHR is transmitted based on physical uplink shared channel (PUSCH).

10. The method of claim 8,
wherein the PHR comprises a power headroom (PH) determined based on a calculation method, and
wherein the calculation method is determined as one of:
a first calculation method to determine the PH based on downlink control information (DCI) for scheduling a physical uplink shared channel (PUSCH) transmission, or
a second calculation method to determine the PH based on a default configuration.

11. The method of claim 10,
wherein the calculation method is determined according to whether the PUSCH transmission is scheduled or not, and
wherein the PUSCH transmission is scheduled or not is according to whether the DCI is received or not.

12. The method of claim 10,
wherein, if the calculation method is determined as the first calculation method, the PH is determined based on:
a maximum transmitting power,
a power offset,
a compensating rate,
a path loss set,
an accumulative value for power control, and
a number of physical resource blocks (PRBs) for the PUSCH transmission obtained by the DCI, and
wherein, if the calculation method is determined as the second calculation method, the PH is determined based on:
a maximum transmitting power set by the default configuration,
a power offset set by the default configuration,
a compensating rate set by the default configuration,
a path loss set by the default configuration, and
an accumulative value for power control set by the default configuration.

13. A terminal in a wireless communication system, the terminal comprising:
at least one transceiver; and
at least one processor operatively coupled with the at least one transceiver, and configured to:
identify first information for indicating a slot length of a first serving cell for a physical uplink shared channel (PUSCH) transmission associated with a first sub-carrier spacing,
identify second information for indicating a slot length of a second serving cell, wherein the slot length of the first serving cell is longer than the slot length of the second serving cell for a PUSCH transmission associated with a second sub-carrier spacing different from the first sub-carrier spacing,
identify a first slot of multiple slots of the second serving cell that fully overlaps with a slot of the first serving cell, based on the first information and the second information, and
transmit, in the slot of the first serving cell, a power headroom report (PHR) for the first slot of the second serving cell to a base station,
wherein the slot of the first serving cell overlaps with the multiple slots of the second serving cell, and
wherein the first slot of the second serving cell that is located at first among slots that fully overlap with the slot of the first serving cell.

14. The terminal of claim 13,
wherein the at least one processor is, to identify the first slot of the multiple slots of the second serving cell, further configured to:
identify that the terminal is configured with a plurality of cells including the first serving cell and the second serving cell, and
identify the first serving cell based on the first information and the second information.

15. The terminal of claim 14,
wherein the at least one processor is, to identify the first slot of the multiple slots of the second serving cell, further configured to:
identify the slot of the identified first serving cell to provide a PHR, that overlaps with the multiple slots of the second serving cell.

16. The terminal of claim 13,
wherein the at least one processor is further configured to:
receive, via a higher layer signaling, a first configuration comprising the first information, and
receive, via a higher layer signaling, a second configuration comprising the second information, and
wherein the PHR is transmitted based on physical uplink shared channel (PUSCH).

17. The terminal of claim 13,
wherein the at least one processor is further configured to determine a calculation method for calculating a power headroom (PH) in the PHR, and
wherein the calculation method is determined as one of:
a first calculation method to determine the PH based on downlink control information (DCI) for scheduling a physical uplink shared channel (PUSCH) transmission, or
a second calculation method to determine the PH based on a default configuration.

18. The terminal of claim 17, wherein the at least one processor is further configured to:
determine whether the PUSCH transmission is scheduled or not according to whether the DCI is received or not,
if it is determined that the PUSCH transmission is scheduled, determine the calculation method as the first calculation method, and
if it is determined that the PUSCH transmission is not scheduled, determine the calculation method as the second calculation method.

19. The terminal of claim 17,
wherein, if the calculation method is determined as the first calculation method, the PH is determined based on:
a maximum transmitting power,
a power offset,
a compensating rate,
a path loss set,
an accumulative value for power control, and
a number of physical resource blocks (PRBs) for the PUSCH transmission obtained by the DCI, and
wherein, if the calculation method is determined as the second calculation method, the PH is determined based on:
a maximum transmitting power set by the default configuration,
a power offset set by the default configuration,
a compensating rate set by the default configuration,
a path loss set by the default configuration, and
an accumulative value for power control set by the default configuration.

20. A base station in a wireless communication system, the base station comprising:
at least one transceiver; and
at least one processor operatively coupled with the at least one transceiver, and configured to:
transmit, to a terminal, first information for indicating a length of a slot of a first serving cell for a physical uplink shared channel (PUSCH) transmission associated with a first sub-carrier spacing,
transmit, to the terminal, second information for indicating a length of a slot of a second serving cell, wherein the slot length of the first serving cell is longer than the slot length of the second serving cell for a PUSCH transmission associated with a second sub-carrier spacing different from the first sub-carrier spacing, and
receive, in a slot of the first serving cell, a power headroom report (PHR) for a first slot of multiple slots of the second serving cell that fully overlaps with the slot of the first serving cell from the terminal,
wherein the first slot of the second serving cell is identified based on the first information and the second information,
wherein the slot of the first serving cell overlaps with the multiple slots of the second serving cell, and
wherein the first slot of the second serving cell that is located at first among slots that fully overlap with the slot of the first serving cell.

21. The base station of claim 20,
wherein the first information is transmitted via a higher layer signaling,
wherein the second information is transmitted via a higher layer signaling, and
wherein the PHR is received based on physical uplink shared channel (PUSCH).

22. The base station of claim 20, wherein the PHR comprises a power headroom (PH).

* * * * *